United States Patent
Ohyoshi et al.

(10) Patent No.: US 7,065,585 B2
(45) Date of Patent: Jun. 20, 2006

(54) METHOD FOR SWITCHING COMMUNICATION MODES AND EXCHANGE THEREFOR

(75) Inventors: Akitsugu Ohyoshi, Kawasaki (JP); Akiko Ishigami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 623 days.

(21) Appl. No.: 09/819,187

(22) Filed: Mar. 28, 2001

(65) Prior Publication Data
US 2002/0026526 A1  Feb. 28, 2002

(30) Foreign Application Priority Data
Aug. 23, 2000  (JP)  .............................. 2000-252403

(51) Int. Cl.
*G06F 15/173* (2006.01)
(52) U.S. Cl. .................. 709/242; 370/395.63; 370/467
(58) Field of Classification Search ................ 709/236, 709/238, 239, 242; 370/395.1, 395.63, 396, 370/395.5, 395.51, 395.6, 466, 467, 474
See application file for complete search history.

(56) References Cited

U.S. PATENT DOCUMENTS

| | | | | |
|---|---|---|---|---|
| 5,440,552 | A * | 8/1995 | Sugita | 370/395.54 |
| 5,557,609 | A * | 9/1996 | Shobatake et al. | 370/395.71 |
| 5,560,038 | A * | 9/1996 | Haddock | 709/236 |
| 5,623,605 | A * | 4/1997 | Keshav et al. | 709/236 |
| 5,764,637 | A * | 6/1998 | Nishihara | 370/397 |
| 5,859,848 | A * | 1/1999 | Miura et al. | 370/395.31 |
| 6,081,524 | A * | 6/2000 | Chase et al. | 709/250 |
| 6,226,260 | B1 * | 5/2001 | McDysan | 370/396 |
| 6,424,662 | B1 * | 7/2002 | Miki et al. | 370/466 |
| 6,430,185 | B1 * | 8/2002 | Kerns et al. | 370/395.1 |
| 6,463,477 | B1 * | 10/2002 | Fontenot | 709/236 |
| 6,493,346 | B1 * | 12/2002 | Cantwell et al. | 370/395.63 |
| 6,529,510 | B1 * | 3/2003 | Lee | 370/395.61 |
| 6,529,529 | B1 * | 3/2003 | Tohkairin | 370/537 |
| 6,574,224 | B1 * | 6/2003 | Brueckheimer et al. | 370/395.6 |
| 6,980,553 | B1 * | 12/2005 | Miki et al. | 370/395.1 |

FOREIGN PATENT DOCUMENTS

| | | |
|---|---|---|
| JP | 063506310 | 12/1994 |
| JP | 09023252 | 1/1997 |
| JP | 11088430 | 3/1999 |

OTHER PUBLICATIONS

Zhou, Peifang and Yang, Oliver, "Integrated Cell and Frame Switching in ATM Networks," IEEE Communications Letters, vol. 3, Issue 6, Jun. 1999, pp. 183-184, DOI: 10.1109/4234.769524.*

* cited by examiner

*Primary Examiner*—Bunjob Jaroenchonwanit
*Assistant Examiner*—Victor Lesniewski
(74) *Attorney, Agent, or Firm*—Katten Muchin Rosenman LLP

(57) ABSTRACT

An exchange capable of easily switching communication modes for gradually shifting all exchanges to ATM exchanges without requiring manual intervention in a network with frame relay exchanges and ATM exchanges mixed therein. This exchange is provided with an ATM side bus and a frame side bus provided in parallel, a frame/cell compatibility function unit inserted in the ATM side bus, and a frame/cell switch unit for alternatively switching between the ATM side bus and the frame side bus. This frame/cell compatibility function unit is comprised of an ATM switch and a frame/cell format converting unit connected with this ATM switch.

23 Claims, 24 Drawing Sheets

METHOD FOR SWITCHING COMMUNICATION MODES AND EXCHANGE THEREFOR

BACKGROUND OF THE INVENTION

1. Field of the Invention

The present invention relates to a communication system having a plurality of exchanges each accommodating a plurality of terminals and a network for connecting these exchanges to each other for transfer of data among these terminals, more particularly relates to a method for switching communication modes in a communication system and an exchange suitable for the switching of communication modes.

In communication systems, the technology for transmission of data has been improved year by year in recent years. A further higher speed and more efficient transfer of data has become possible. On the other hand, for this purpose, work on developing exchanges is continuing, for example, from first mode exchanges to second mode exchanges and further to third mode exchanges.

As a result of such development work, all exchanges will ultimately be changed to the highest speed and highest efficiency third mode exchange.

During the transition, the exchanges of the first mode, second mode, and third mode will be mixed. In a communication system wherein exchanges of various modes are mixed in this way, however, it is not easy to change all of the exchanges of the first mode and second mode to exchanges of the third mode without hindering service to users transferring data.

The present invention relates to a technique for switching communication modes suitable for such a transition of exchange modes. Note that, as the exchanges of the first mode, second mode, and third mode, at the present time, there are specifically a packet exchange, a frame relay exchange, and an asynchronous transfer mode (ATM) exchange. The following explanation will be given of a frame relay exchange and an ATM exchange.

2. Description of the Related Art

In conventional communication systems, extensive use has been made of packet switch networks providing at the network side a function for the retransmission of data at the time of occurrence of error to enable high reliability data communication. Thereafter, however, the quality of dedicated lines provided by carriers, i.e., the quality of channels, was improved, so the necessity of providing the retransmission function at the network side abated. Under such conditions, by eliminating the need for the retransmission function and simplifying the communication processing by that amount, a frame relay switch network was developed enabling a further higher through-put.

Recently, there have been rising user demands for accommodating a data network comprised of a frame relay switch network and a general telephone network in one integrated network to enable the dedicated lines to be efficiently used. There has therefore been a tendency of a further shift to an ATM switch network employing a cell exchange system enabling a guarantee of bandwidth and a small delay in data communication considering the quality of service (QoS). The situation of this transition will be explained in detail later by referring to FIG. 22 to FIG. 24.

As will be explained later based on FIG. 22 to FIG. 24, at the time of the transition from the already existing frame relay switch networks (packet switch networks) to ATM switch networks, naturally there has been an accompanying transition in the format of data communications. Accordingly, it is necessary to minimize the downtime of communication accompanying the shift in order to keep the influence exerted upon the end user at the lowest limit. That is, the work for the shift must be finished in a short time. For this reason, the work for the shift such as replacement of hardware and change of connection of relay lines has to be kept extremely simple and smoothly carried out.

However, conventionally, it is necessary for each office to manually change the connections of relay lines with remote offices almost simultaneously, so there is a problem in that it becomes extremely difficult to quickly make the change in a short time when there are a large number of offices.

Also, in the work for reconnection of cables, which becomes necessary when changing connection of relay lines, it is extremely difficult from the viewpoint of the limited work time to completely eliminate human error such as connection error, so there is also a problem of a lack of reliability of the work for the shift.

Further, there are often various constraints on the installation sites. In addition, due in part to the lack of sufficient skilled human resources, there is a problem that execution of the work for the shift is accompanied by high risk in a large sized communication system that accommodates a large number of offices.

SUMMARY OF THE INVENTION

An object of the present invention is to provide, in view of the above problems, a highly reliably method for switching communication modes capable of executing the switch by minimal manpower smoothly in a short time and an exchange suitable for the change of communication modes.

To attain the above object, the present invention provides an exchange provided with an ATM side bus and a frame side bus provided in parallel, a frame/cell compatibility function unit inserted in the ATM side bus, and a frame/cell switch unit for alternatively switching the ATM side bus and the frame side bus. This frame/cell compatibility function unit is comprised of an ATM switch and a frame/cell format converting unit connected to this ATM switch.

BRIEF DESCRIPTION OF THE DRAWINGS

The above object and features of the present invention will be more apparent from the following description of the preferred embodiments given with reference to the accompanying drawings, wherein.

DESCRIPTION OF THE PREFERRED EMBODIMENTS

Before describing the embodiments of the present invention, the related art and the disadvantages therein will be described with reference to the related figures.

As already explained, recently, there have been rising user demands for accommodating a data network comprised of a frame relay switch network and a general telephone network in one integrated network to enable the dedicated lines to be efficiently used. There has therefore been a tendency of a further shift to an ATM switch network employing a cell exchange system enabling a guarantee of bandwidth and a small delay in data communication considering the quality of service (QoS). The situation of this shift will be shown below by using the drawings.

Figure 22:
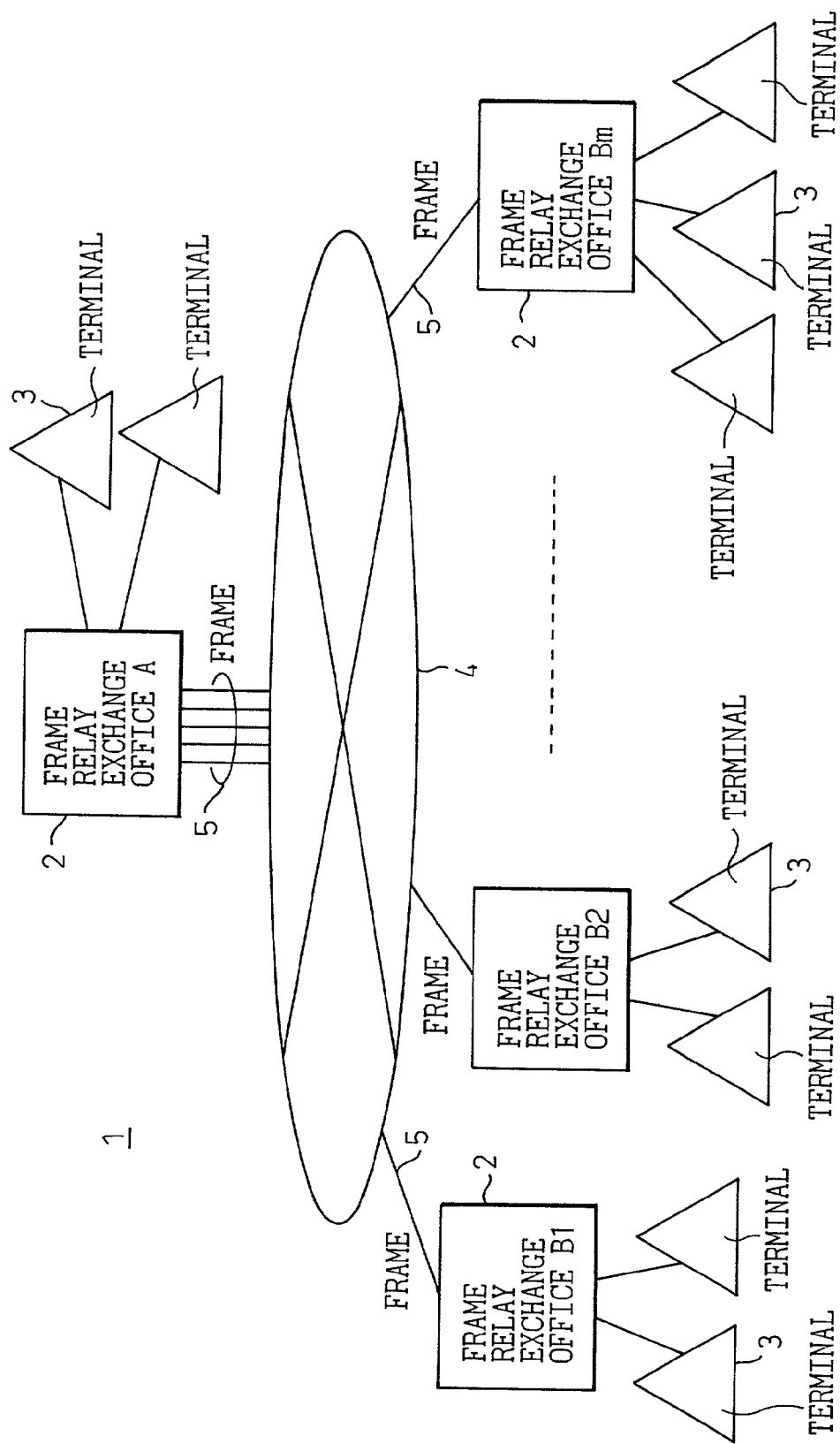
FIG. 22 is a view conceptually representing an initial phase (before shift) of a shift from a frame relay switch network to an ATM switch network.
Figure 23:
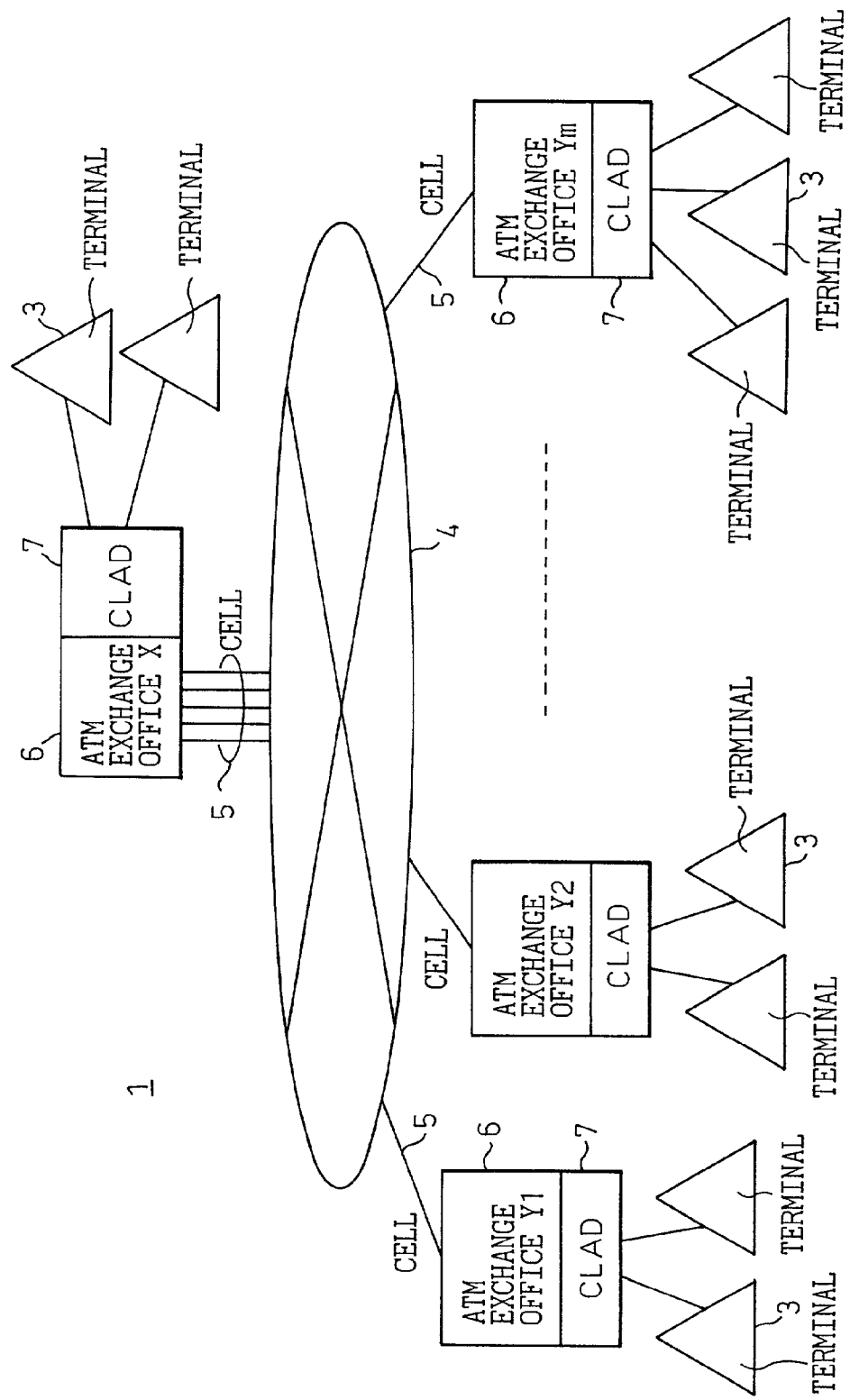
FIG. 23 is a view conceptually representing a final phase (after shift) of the shift from the frame relay switch network to the ATM switch network.

FIG. 22 is a view conceptually representing an initial phase (before shift) of the shift from a frame relay switch network to an ATM switch network, and FIG. 23 is a view conceptually representing a final phase (after shift) of the shift from a frame relay switch network to an ATM switch network.

Referring to FIG. 22 first, in the figure, reference numeral 1 denotes a communication system. This communication system 1 is comprised of a plurality of frame relay exchanges (office A, office B1, office B2, . . . , and office Bm) 2, a plurality of terminals 3 such as packet terminals or frame relay terminals accommodated under the frame relay exchanges 2, and a network 4 for data transfer among these terminals (3) in a frame format ("frame" in the figure) via the frame relay exchanges 2. The network 4 and the frame relay exchanges 2 are connected by relay lines 5.

Note that, in the figure, in order to represent a situation where individual relay lines connect between the frame relay exchanges and each remote office (opposing offices B1, B2, . . . , Bm) for the frame relay exchange (office A) 2, a plurality of relay lines 5 are shown only for the relay exchange (office A). If multiplexing, however, one relay line is sufficient.

Also, the network 4 forming the frame relay switch network as a whole together with the relay lines 5 etc. is for example a high speed digital network or an ISN network functioning as an ISDN backup line.

The communication system 1 comprised of such a frame relay switch network shown in FIG. 22 is being shifted to a communication system 1 comprised of ATM switch networks. When the shift is completed, the communication system 1 shown in FIG. 23 will be obtained.

As shown in FIG. 23, when the shift is completed, the frame relay exchanges 2 shown in FIG. 22 will all be replaced by ATM exchanges 6. Thus, data will be transferred by the signal format of cells ("CELL" in the figure) among the terminals (3) via the network 4 comprised of a high speed digital network or INS network and ATM exchanges 6, whereby an ATM switch network will be formed as a whole.

In this case, each ATM exchange 6 is provided with a cell assembly and deassembly (CLAD) unit 7 externally or built therein. In further detail, each ATM exchange 6 making up part of the ATM switch network is further provided with a CLAD function unit, that is, a CLAD function for accommodating terminals 3 such as the packet terminals or frame relay terminals which had been accommodated in the frame relay exchange 2 before the shift and converting frames into the cell format or returning the input cells to the frame format.

Figure 24:
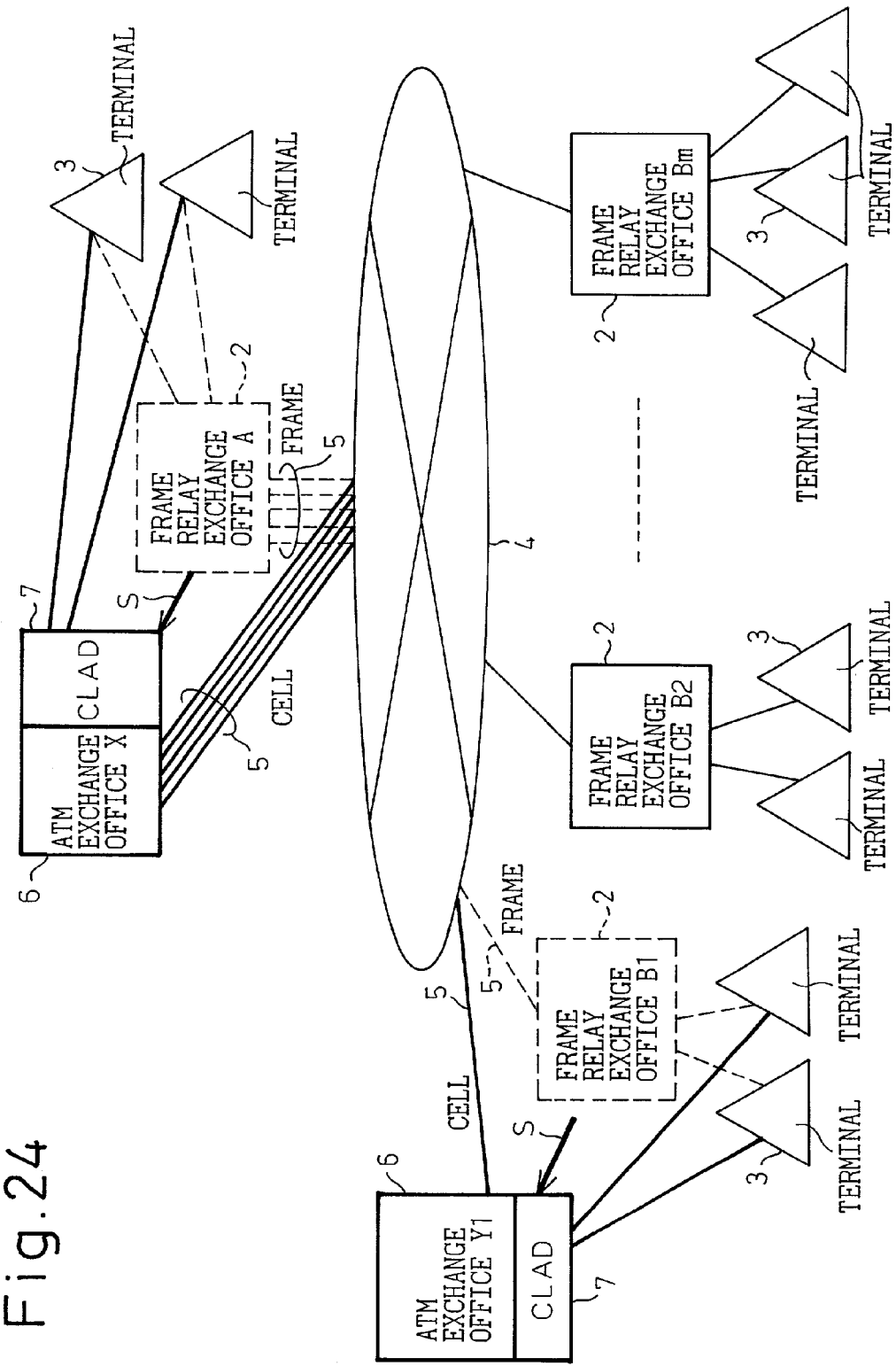
FIG. 24 is a view conceptually representing an intermediate phase (in shift) of the shift from the frame relay switch network (FIG. 22) to the ATM switch network (FIG. 23).

FIG. 24 is a view conceptually representing an intermediate phase (during shift) of the shift from the frame relay switch network (FIG. 22) to the ATM switch network (FIG. 23). This is the phase where the present invention is being effectively applied.

Note that the components shown in the present figure are all shown in FIG. 22 and FIG. 23 explained above. Particularly, the bold arrows S in the figure schematically show the shift.

As already explained, at the time of a shift (S) from an already existing frame relay switch network (packet switch network) shown in FIG. 22 to an ATM switch network shown in FIG. 23, naturally there has been an accompanying transition in the format of data communications. Accordingly, it is necessary to minimize the downtime of communication accompanying the shift in order to keep the influence exerted upon the end user at the lowest limit. That is, the work for the shift must be finished in a short time. For this reason, the work for the shift such as replacement of hardware and change of connection of relay lines has to be kept extremely simple and smoothly carried out.

However, conventionally, it is necessary for each office to manually change connections of relay lines almost simultaneously with remote offices (for example between the office A and the office B1 and between the office A and the office B2 of the exchange 2 of FIG. 24), so there is the above problem that it becomes extremely difficult to quickly perform the shift in a short time when there are a large number of the offices such as the office Y1, office Y2, . . . , office Ym shown in FIG. 23.

Also, in the work for reconnection of cables which becomes necessary at the change of connection of relay lines, it is extremely difficult from the viewpoint of the limited work time to completely eliminate human error such as connection error, so there is also the above problem that the transition work is unreliable.

Further, where there are constraints on the installation site, for example, as shown in FIG. 24, when it is intended to replace the exchange from the office A to the office X, it is necessary to substantially simultaneously replace all of the offices of the offices B1 to Bm of the remote exchange 2 by the offices Y1 to Ym of the exchange 6 of FIG. 23. In this case, due in part to the shortage of skilled human resources, there is the above problem that the execution of the work for the shift is accompanied by high risk in a large sized communication system 1 that accommodates a large number of the above offices B1 to Bm.

Accordingly, in consideration of the above problem, the present invention provides a highly reliably method for switching communication modes capable of executing the switch by minimal manpower smoothly in a short time and an exchange suitable for the change of communication modes. This will be explained in detail below.

Figure 1:
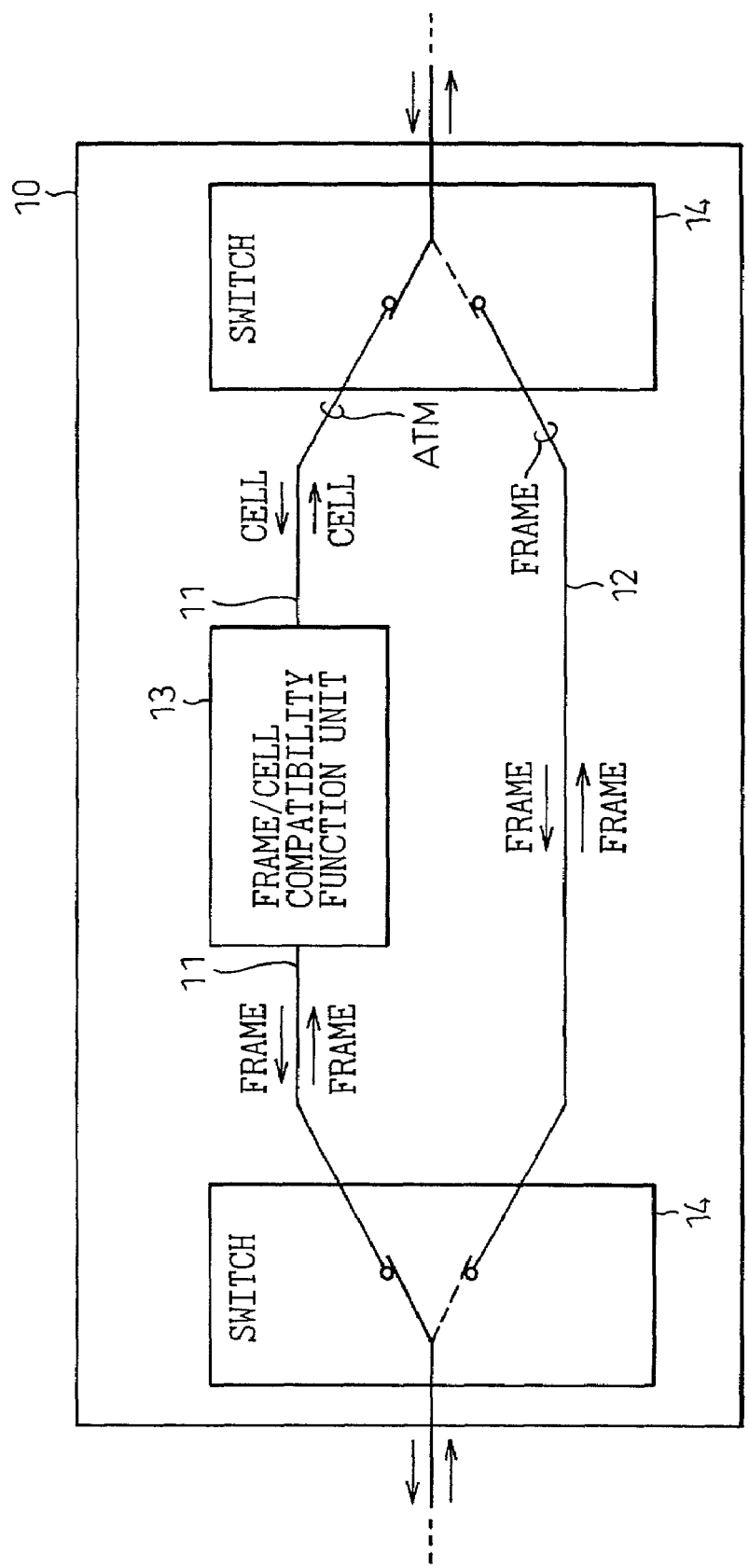
FIG. 1 is a view of the concept of an exchange 10 according to the present invention.

FIG. 1 is a view representing the concept of the exchange according to the present invention.

In the figure, reference numeral 10 represents the exchange according to the present invention. This is a so-called frame/cell compatible type exchange.

This exchange 10 is comprised of, as illustrated, an ATM side bus 11 and a frame side bus 12 provided in parallel, a frame/cell compatibility function unit 13 inserted in the ATM side bus 11, and a frame/cell switch unit 14 for alternatively switching the ATM side bus 11 and the frame side bus 12. Note that in the example of the figure, a pair of the frame/cell switch units 14 are shown as the left and right side frame/cell switch units 14 which are interlocked with each other.

By employing the frame/cell compatible type exchange 10 shown in FIG. 1 as the ATM exchange 6 shown in FIG. 24, the method of switching communication modes characterizing the present invention shown next is realized. The communication modes referred to here mean the ATM mode and the frame relay mode. The steps of the method are as follows.

Namely, this is a method for switching communication modes for shifting exchanges from frame relay exchanges 2 to ATM exchanges 6 in a communication system 1 having a plurality of exchanges, each accommodating a plurality of terminals 3 and including a frame relay exchange 2, and a network 4 for connecting the plurality of exchanges to each other for transfer of data among the plurality of terminals (3), comprising
 a first step of selecting any one exchange among the plurality of exchanges,
 a second step of operating the selected exchange as a frame/cell compatible type exchange (10 of FIG. 1) capable of handling both frames and cells, and
 a third step of executing the first step and second step for an exchange which has not yet been selected.

Then, the third step is further repeated to autonomously shift all exchanges 10 to ATM exchanges 6.

The above method for switching communication modes will be explained further simply below.

Referring to FIG. 24 again, assume that the frame relay exchange (office A) 2 and the frame exchange (office B1) 2 are replaced by the exchange (office X) 10 and the exchange (office Y1) 10 having the configuration of FIG. 1.

Then, when noting for example the exchange (office X), this exchange (office X) behaves as a frame relay exchange 2 with respect to the frame relay exchanges (office B2, . . . , office Bm) 2. On the other hand, the exchange (office X) 10 behaves as an ATM exchange 6 with respect to the ATM exchange (office Y1) 6.

Then, thereafter, the remaining frame relay exchanges (office B2, . . . , office Bm) 2 are gradually replaced by the exchanges 10 having the configuration of FIG. 1 one by one. At this time, in the same way as that explained above, each exchange 10 replaced from the frame relay exchange 2 autonomously switches its own mode to match with the mode of an opposing communication destination (whether ATM or frame relay).

Finally, when all of the frame relay exchanges 2 of FIG. 24 are replaced by the exchanges 10 having the configuration of FIG. 1, none of the exchanges 10 has to behave as a frame relay exchange any longer. That is, when all exchanges become the exchanges 10 having the configuration of FIG. 1, all exchanges substantially shift to the ATM exchanges 6 of FIG. 23 (after shift) at this point of time.

According to the method for switching communication modes as described above,
 (i) each exchange 2 may be switched to an exchange 10 independently at a freely set time without considering linkage with the remote exchanges at all,
 (ii) the reconnection work of the cables when changing the connections of the relay lines and the work of replacing the hardware may be carried out at a time without having to worry about conditions at the remote office side and enabling sufficient confirmation of error-free work in the related office, and
 (iii) since the work of the above (ii) can be independently and freely carried out by each office, the work can be carried out with when enough personnel for the work can be secured. Thus, the above problems in the related art can be solved at one stroke.

The exchange of the present invention for realizing the method for switching communication modes giving the advantages of the above (i) to (iii), that is, the frame/cell compatible type exchange 10 shown in FIG. 1, will be explained in further detail below.

Figure 2:
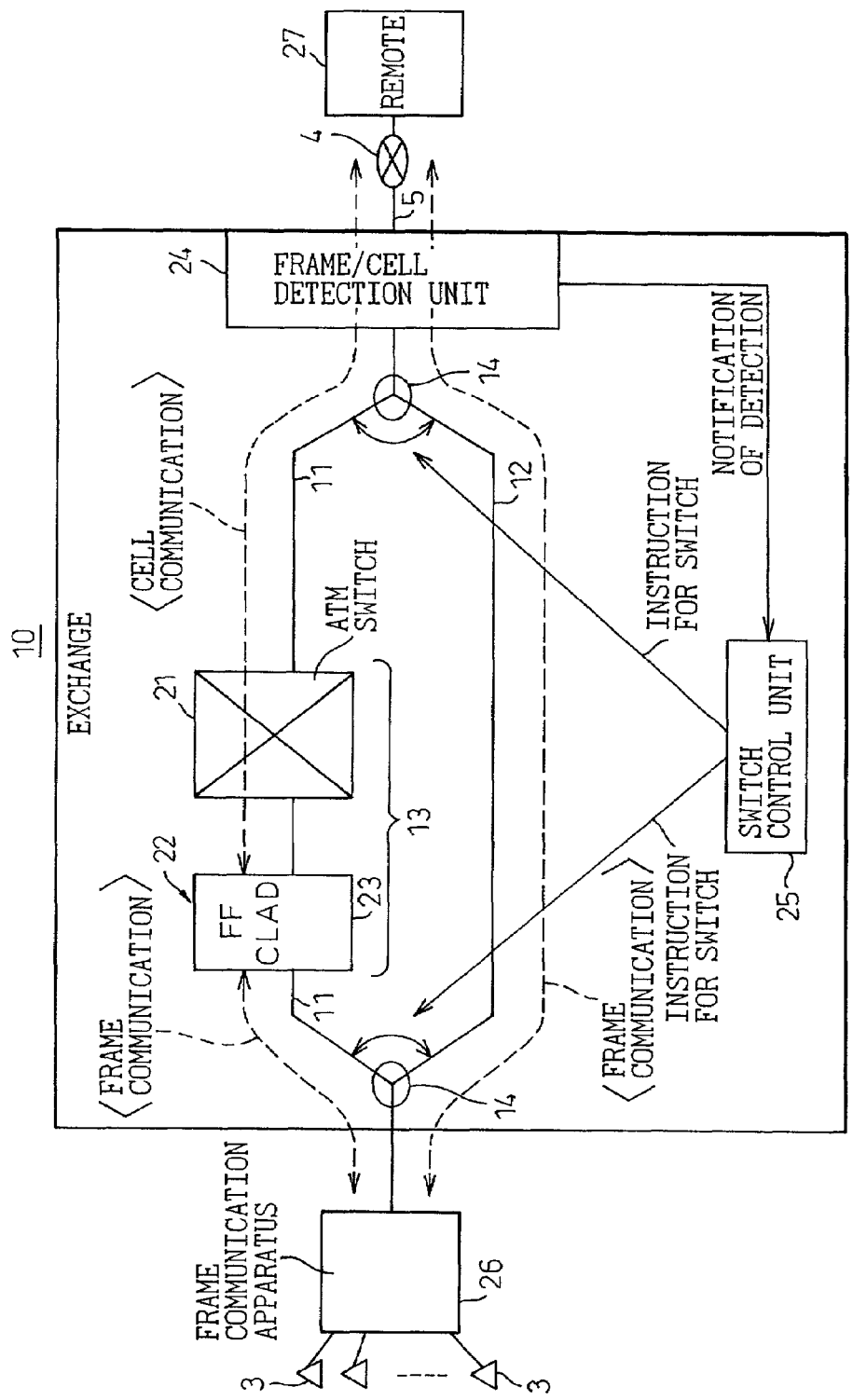
FIG. 2 is a view of the fundamental configuration of the exchange 10 according to the present invention.

FIG. 2 is a view of the fundamental configuration of an exchange 10 according to the present invention.

Note that, throughout all the drawings, identical reference numerals or symbols are attached to similar components.

In FIG. 2, the terminal 3, network 4, relay line 5, ATM side bus 11, frame side bus 12, frame/cell compatibility function unit 13, and frame/cell switch unit 14 are as already explained.

First, the frame/cell compatibility function unit 13 is comprised of an ATM switch 21 and a frame/cell format converting unit 22 connected to this ATM switch 21.

This ATM switch 21 itself is a well known ATM switch and routes cells according to a VPI and a VCI given to the header of each cell.

On the other hand, the frame/cell format converting unit 22 converts the input signal to the frame signal format or to the cell signal format. Concretely, the frame/cell format converting unit 22 is comprised of a frame forwarding CLAD circuit 23. In the figure, it is indicated as FF (Frame Forwarding)-CLAD.

The above frame/cell switch unit 14 decides whether to switch to the ATM side bus 11 with the FF-CLAD circuit 23 etc. inserted therein or to switch to the frame side bus 12. In this case, the frame/cell switch unit 14 switches between the ATM side bus 11 and the frame side bus 12 in accordance with an instruction from the outside. There are two methods for giving the instruction.

Figure 4:
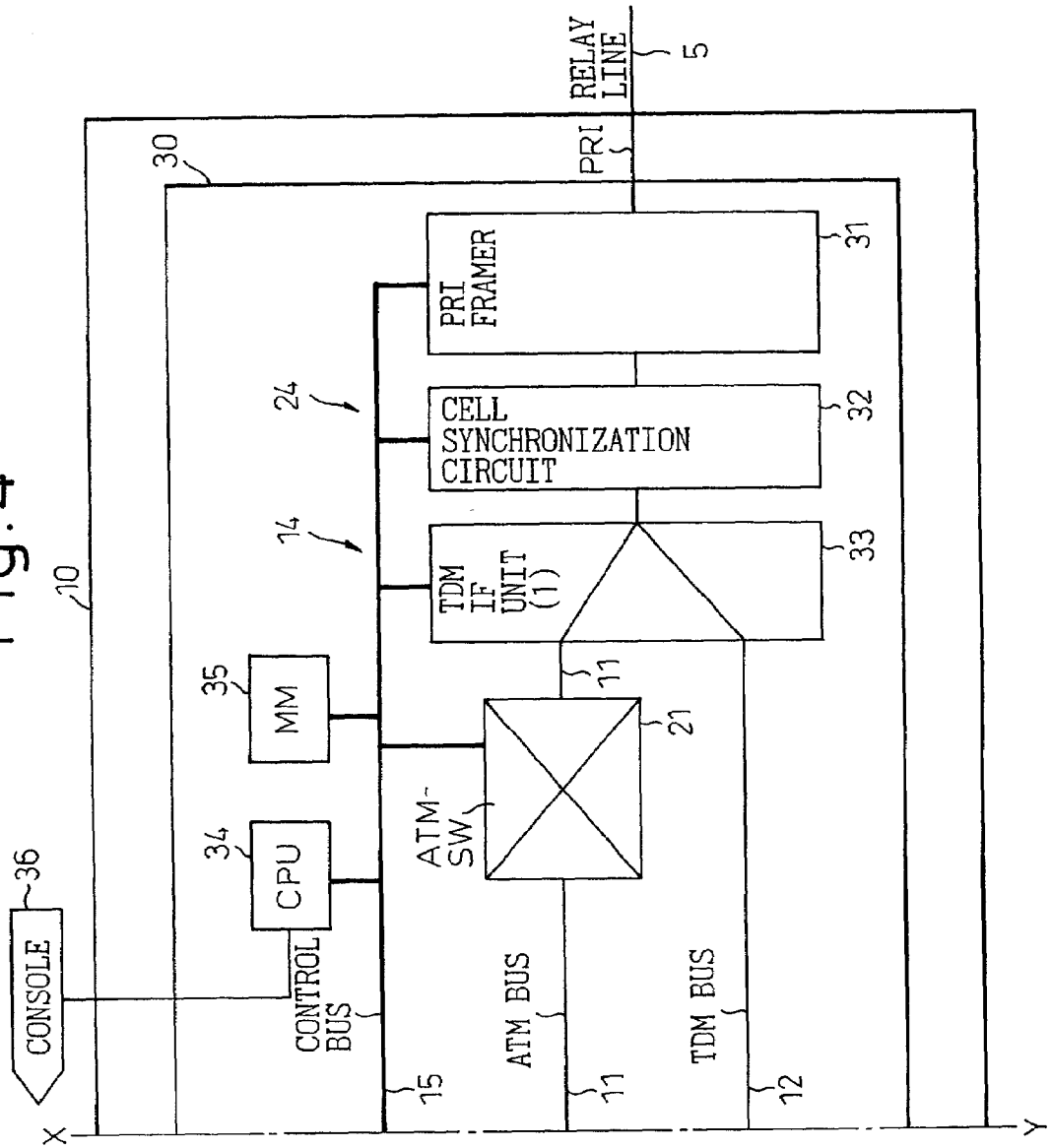
FIG. 4 is a second part of a concrete view of an example of the system configuration of the exchange shown in FIG. 2.

First, the instruction is given according to the office data registered in advance (stored in the memory MM of FIG. 4).

Also, second, as shown in FIG. 2, provision is further made of a frame/cell detection unit 24 for detecting whether a signal input from the outside is a frame or a cell. The instruction is created in accordance with the result of detection by this frame/cell detection unit 24.

As the instruction, use can be made of either one or both of a first instruction and a second instruction. When a second instruction is used, as shown in FIG. 2, use is made of a switch control unit 25 for control by an "instruction for switch" in the figure by receiving as input the result of detection by the frame/cell detection units 24 ("notification of detection" in the figure) and interlocking the pair of frame/cell switch units 24.

When viewing the method for switching communication modes in relation to the first instruction (office data) and the second instruction "notification of detection"), in the above second step, whether the opposing exchange or the opposing terminal of the other party of communication operates for frames or operates for cells is registered as the office data (first instruction) at the selected exchange side at the above first step in advance. The selected exchange can be operated as an exchange operating for frames or an exchange operating cells according to the office data.

Similarly, in the second step, it is also possible to automatically identify at the frame/cell detection unit 24 in the selected exchange whether the opposing exchange or opposing terminal of the other party of communication operates either for frames or cells and operate the related exchange as an exchange operating for frames or an exchange operating for cells according to the result of the identification (corresponding to the second instruction). Note that, in the following explanation, the case according to the second instruction will be mainly taken as an example.

Returning to FIG. 2 again and further supplementing the explanation, block 26 on the left end in the figure is a frame communication apparatus. This frame communication apparatus 26 may be built in the exchange 10 as a frame relay processing unit or a packet exchange processing unit.

On the other hand, block 27 on the right end of the figure, labeled as "remote", refer overall to either or both of the opposing exchanges (2, 6, 10) or opposing terminal (3) of the other party of communication.

Next, an explanation will be given of the frame/cell compatible type exchange 10 (FIG. 1 and FIG. 2) by referring to FIG. 3.

Figure 3:
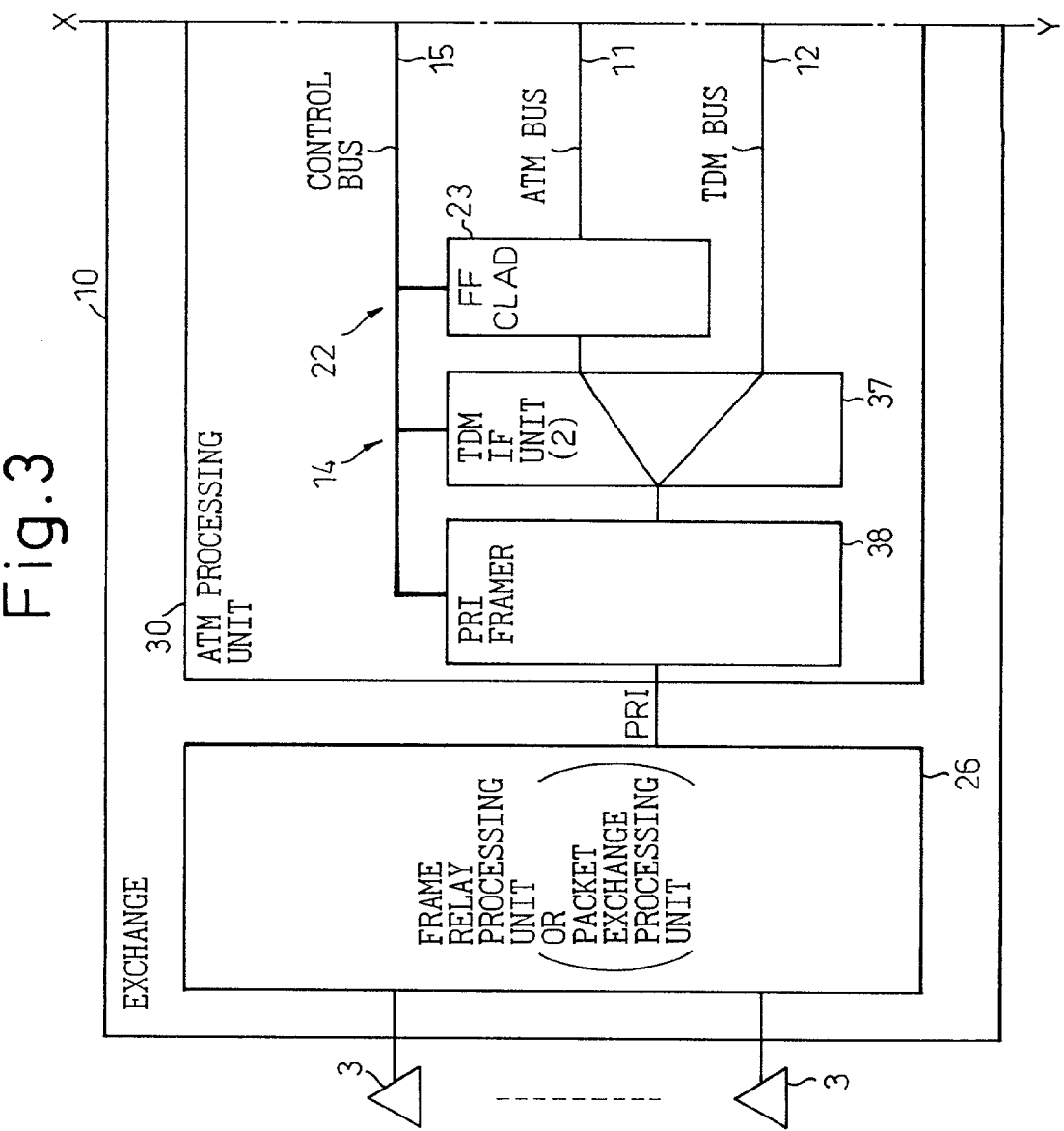
FIG. 3 is a first part of a view of a concrete example of the system configuration of the exchange shown in FIG. 2.

FIG. 3 and FIG. 4 are first and second parts of a view of a concrete example of the system configuration of the exchange shown in FIG. 2.

As shown in FIG. 3 and FIG. 4, according to an actual system configuration, the frame/cell compatible type exchange 10 includes an ATM processing unit 30 and the frame communication apparatus 26. In this ATM processing unit 30, portions corresponding to the components shown in FIG. 2 are indicated by the same reference numerals. For example, the above frame/cell detection unit 24 is comprised of a cell synchronization circuit 32. Also, each of the above pair of frame/cell switch units 14 is comprised of a TDM-IF unit (1) 33 and a TDM-IF unit (2) 37.

When it is detected by the frame/cell detection unit 24 (32) that the signal input from the outside is comprised of frames, the frame/cell switch unit 14 (33, 37) switches to the frame side bus 12 and passes the frames through the frame side bus 12 while keeping the signal format.

On the other hand, when it is detected by the frame/cell detection unit 24 (32) that the signal input from the outside is comprised of cells, the frame/cell switch unit 14 (33, 37) switches to the ATM side bus 11, inputs the cells to the frame/cell compatibility function unit 13 (21, 23), processes the cells and converts them to the frame signal format, then passes them through the ATM side bus 11.

Below, a detailed explanation will be given of the configurations of FIG. 3 and FIG. 4.

The exchange 10 is the frame/cell compatible type exchange for realizing the present invention and is comprised of the frame communication apparatus (frame relay processing unit) 26 and an ATM processing unit 30. These processing units are connected by a primary rate interface (PRI). Here, PRI is shown as an example, but if the speed is identical to that on the relay line 5 side, it may be also be a basic rate interface (BRI), V interface, or X interface.

The frame relay processing unit 26 is connected with the ATM processing unit 30 by the PRI and processes the frame relay protocol of the ITU-T Recommendations Q.922 and Q.933. Note that this frame relay processing unit may also be a packet exchange processing unit for processing of the packet exchange protocol of ITU-T Recommendations X.25 and X.75.

The ATM processing unit 30 is connected with the frame relay processing unit 26 by PRI and comprised of the following units. The units in this ATM processing unit 30 are connected by a control bus 15, ATM side bus 11, and TDM bus (frame side bus) 12 as shown in FIG. 3 and FIG. 4.

The ATM switch (ATM-SW) 21 performs the exchange control, usage parameter control (UPC), a scheduler control, and so on.

The CPU 34 performs processing by programs explained later and handles the overall control. Also, the CPU 34 is connected with a system console 36 by a serial interface etc.

The memory (MM) 35 stores the programs and tables explained later and cooperates with the CPU 34.

The PRI framers 31 and 38 are circuits for performing the processing of the layer 1 of the PRI.

The cell synchronization circuit 32 acts as a principal portion of the frame/cell detection unit 24, detects the state of loss of cell delineation (LCD) of the received cells, and reflects the state in a cell synchronization state indication table (49 of FIG. 5) explained later. The state can be referred to by software.

The FF-CLAD circuit 23 converts frames of a high level data link control (HDLC) format received from the time division multiplex interface (TDM-IF) (2) 37 to an ATM adaptation layer (AAL) 5 format, and then converts them into the cell format and sends them to the ATM side bus 11. Also, it returns the cells received from the ATM side bus 11 to the AAL format and then reversely converts them to frames of the HDLC format which it then sends to the TDM-IF unit (2) 37.

The TDM-IF unit (1) 33 switches between sending the data from the relay line 5 to the frame side bus (TDM bus) 12 or to the ATM switch (ATM-SW) 21 under software control (control as the frame/cell switch unit 14).

The TDM-IF unit (2) 37 switches between sending data from the PRI framer 38 to the frame side bus (TDM bus) 12 or to the FF-CLAD circuit 23 side under software control (control as the frame/cell switch unit 14).

Next, a detailed explanation will be given of the operation in the above system configuration shown in FIG. 3 and FIG. 4 focusing on the memory (MM) 35 and the CPU 34 cooperating with the system console 36.

Figure 5:
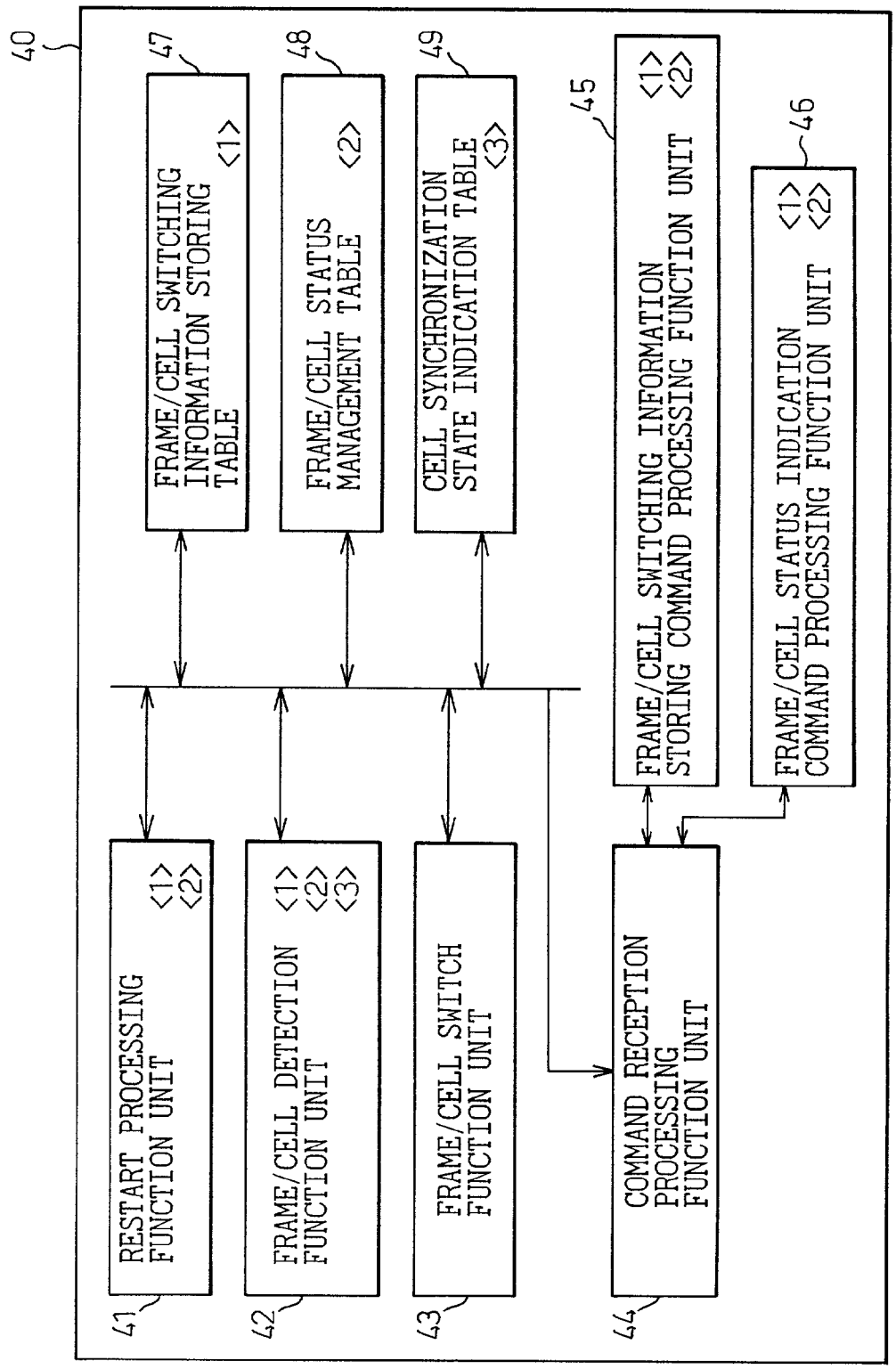
FIG. 5 is a view of functional blocks of a central processing system constructed by a central processing unit 34 and a memory 35.

FIG. 5 is a view of function blocks of the central processing system constructed by the CPU 34 and the memory 35.

In the figure, the central processing system 40 is constructed by illustrated function units 41, 42, 43, 44, 45, and 46 and illustrated tables 47, 48, and 49 opened in the MM 35. The programs are executed in the system 40. Note that, <1>, <2>, and <3> in the blocks 41 to 46 indicate which of the tables <1>, <2>, and <3> shown on the right side of the figure is to be referred to.

The restart processing function unit 41 initializes the ATM-SW 21, FF-CLAD circuit 23, PRI framers 31 and 38, TDM-IF unit (1) 33, TDM-IF unit (2) 37, and the cell synchronization circuit 32 at the restart of the system (when starting up the offices in FIG. 24). Also, "classification of monitor" is decided by the frame/cell switching information storing table 47. As the "classification of monitor", there are "AUTO", "FRAME", and "CELL". In the case of "AUTO", the "monitor state" in the frame/cell status management table 48 is brought to the initial state, then a first certain time t1 in the frame/cell switching information storing table 47 is set in a "time counter". Also, in the case where the "classification of monitor" is "FRAME" or "CELL", the TDM-IF unit (1) 33 and TDM-IF unit (2) 37 are switched.

The frame/cell detection function unit 42 is periodically activated (activated for every 200 ms) by the operating system, decides the "classification of monitor" in the frame/cell switching information storing table 47, refers to the cell synchronization state indication table 49, and updates the frame/cell status management table 48 in the case of "AUTO". When the change of the frame/cell status is detected by the related program, the frame/cell switch function unit 43 is activated.

Also, the function unit 42 decides the "classification of monitor" in the frame/cell switching information storing table 47 and activates the frame/cell switch function unit 43 when "FRAME" or "CELL" has been set.

The frame/cell switch function unit 43 is activated by the frame/cell detection function unit 42 and executes each switch operation with respect to the TDM-IF unit (1) 33 and the TDM-IF unit (2) 37.

The command reception processing function unit 44 receives a registered command from an operator of the present system 40 via the system console 36. When receiving a frame/cell switching information storing command, it activates the frame/cell switching information storing command processing function unit 45. When receiving the frame/cell state indication command, it activates the frame/cell status indication command processing function unit 46.

The frame/cell switching information storing command processing function unit 45 is activated by the command reception processing function unit 44 and stores parameters entered by the operator (for example, the classification of monitor and t1, t2, and t3 indicating first, second, and third certain times for protection) in the frame/cell switching information storing table 47. Note that, as t1, t2, and t3, in the frame/cell switching information storing table 47, quotients obtained by dividing timer values designated by the operator as the parameter by command (command parameter) by 200 ms are set. As explained above, since the operating system is periodically activated every 200 ms, if the time is handled as quotients by division by 200 ms, decrement of the timer counter (decrement of t1, t2, and t3) is simplified. Also, the "detection state" in the frame/cell status management table 48 is initialized and the t1 shown in the frame/cell switching information storing table 47 is set in the "timer counter".

The frame/cell status indication command processing function unit 46 is activated by the command reception processing function unit 44, refers to the frame/cell switching information storing table 47 and the frame/cell status management table 48, and displays the "classification of monitor" and the "detection state" in the case where the classification of monitor is "AUTO" on the system console 36. Namely, it displays the switch state to the ATM side bus 11 or the frame side bus 12 by the frame/cell switch unit 14 on this system console 36.

The frame/cell switching information storing table 47 holds the above t1, t2, and t3 and "classification of monitor" indexed by line number and B channel number. Here, t1 is an initial state decision-protection time, t2 is a frame→cell switch-protection time, and t3 is a cell→frame switch-protection time. These times are times for so-called forward protection or backward protection. Note that, t1, t2, and t3 are stored in the table 47 as quotients obtained by dividing the timer values designated by the above-mentioned command parameter by 200 ms.

The frame/cell status management table 48 holds the "detection state" and the "timer counter" indexed by the line number and B channel number.

The cell synchronization state indication table 49 holds the "cell synchronization state" indexed by the line number and B channel number. The "cell synchronization state" in this table 49 is set by hardware using the cell synchronization circuit 32. Then, the software periodically refers to this table 49 by the periodically activated (200 ms) frame/cell detection function unit 42.

Below, an explanation will be given of the operation at the central processing system 40 of FIG. 5 explained above.

Figure 6:
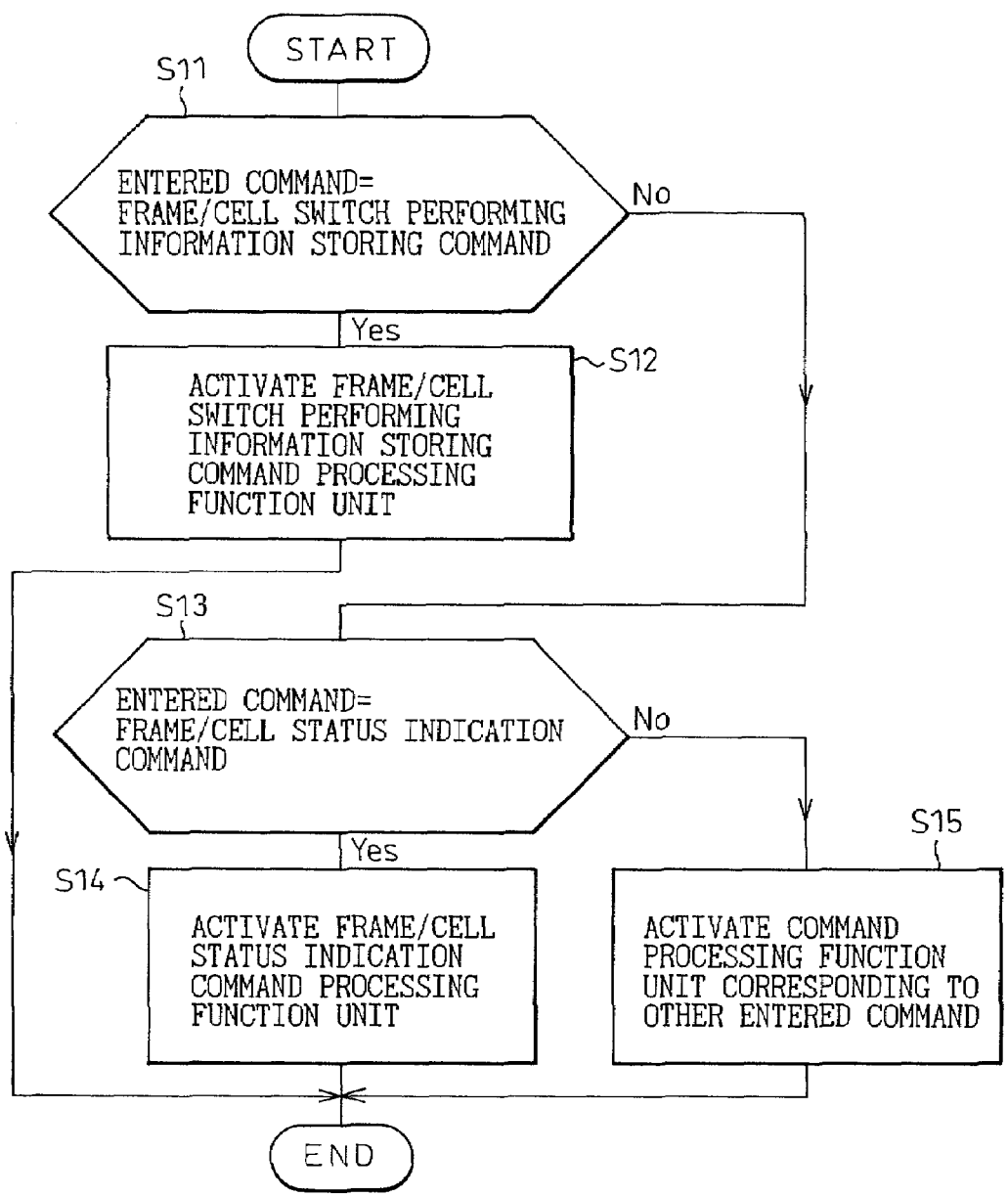
FIG. 6 is a view of the flow of processing of a command reception processing function unit 44 shown in FIG. 5.
Figure 7:
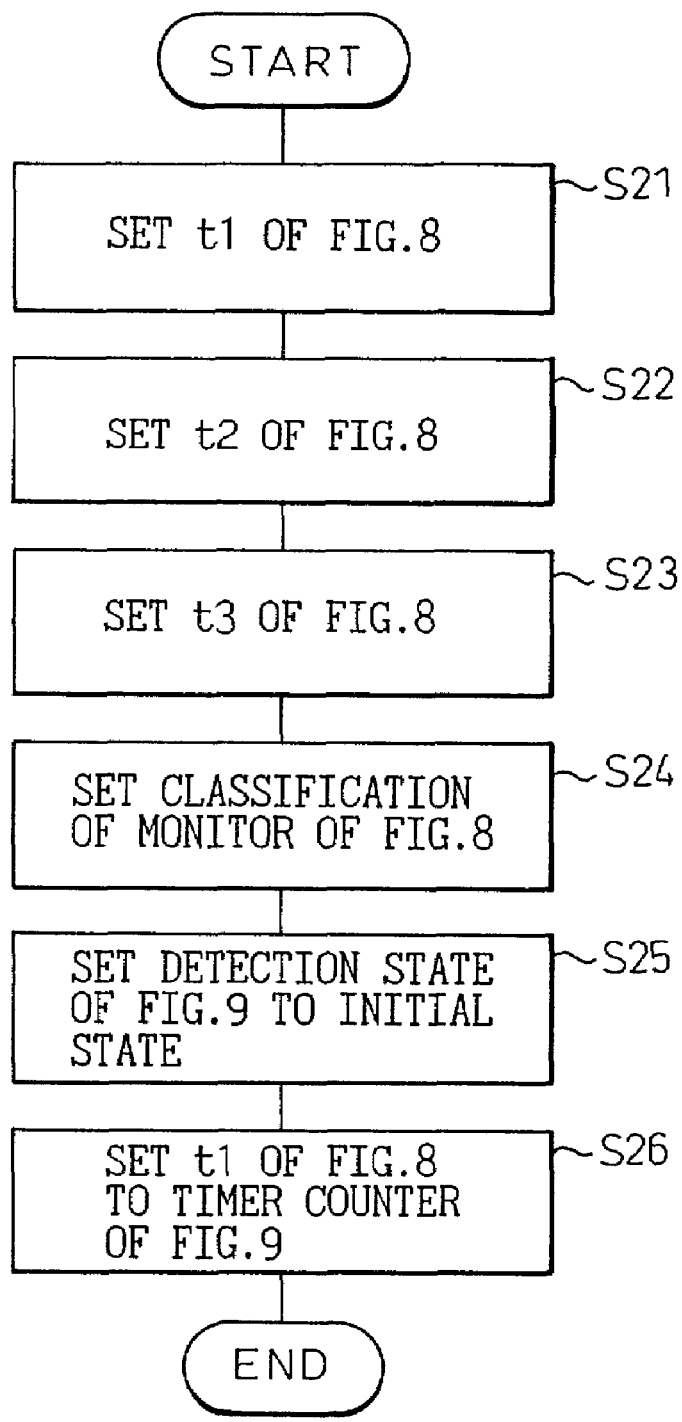
FIG. 7 is a view of the flow of processing of a frame/cell switching information storing command processing function unit 45 shown in FIG. 5.

(1) The operator registers the initial state decision-protection time (t1), frame→cell switch-protection time (t2), and the cell→frame switch-protection time (t3) in advance from the system console 36 for every line number and B channel number by the frame/cell switching information storing command. When this command is entered, the command reception processing function unit 44 is activated, and the frame/cell switching information storing command processing function unit 45 is activated by a predetermined flow I (FIG. 6). In this frame/cell switching information storing command processing function unit 45, the required values are set in the predetermined table by a predetermined flow II (FIG. 7). The predetermined flow I (FIG. 6) and flow II (FIG. 7) and the table will be shown in further detail later.

FIG. 6 is a view of the flow of processing of the command reception processing function unit 44 shown in FIG. 5.

In the figure,

Step S11: It is decided if the entered command is a frame/cell switching information storing command.

Step S12: When the result of decision is Yes, the frame/cell switching information storing command processing function unit 45 is activated.

Step S13: When the result of decision is No, it is decided if the entered command is a frame/cell status indication command.

Step S14: When the result is Yes, the frame/cell status indication command processing function unit 46 is activated.

Step S15: When the result is No, the command processing function unit corresponding to the other entered command is activated. Note, this step 15 is not related to the present invention.

The predetermined flow II (FIG. 7) is shown by the flowchart.

FIG. 7 is a view of the flow of processing of the frame/cell switching information storing command processing function unit 45 shown in FIG. 5.

In the figure,

Step S21: A quotient obtained by dividing the t1 designated by the command parameter by 200 ms is set for t1 of FIG. 8.

Step S22: A quotient obtained by dividing the t2 designated by the command parameter by 200 ms is set for t2 of FIG. 8.

Step S23: A quotient obtained by dividing the t3 designated by the command parameter by 200 ms is set for t3 of FIG. 8.

Step S24: The classification of monitor designated by the command parameter is set for the classification of monitor of FIG. 8.

Figure 9:
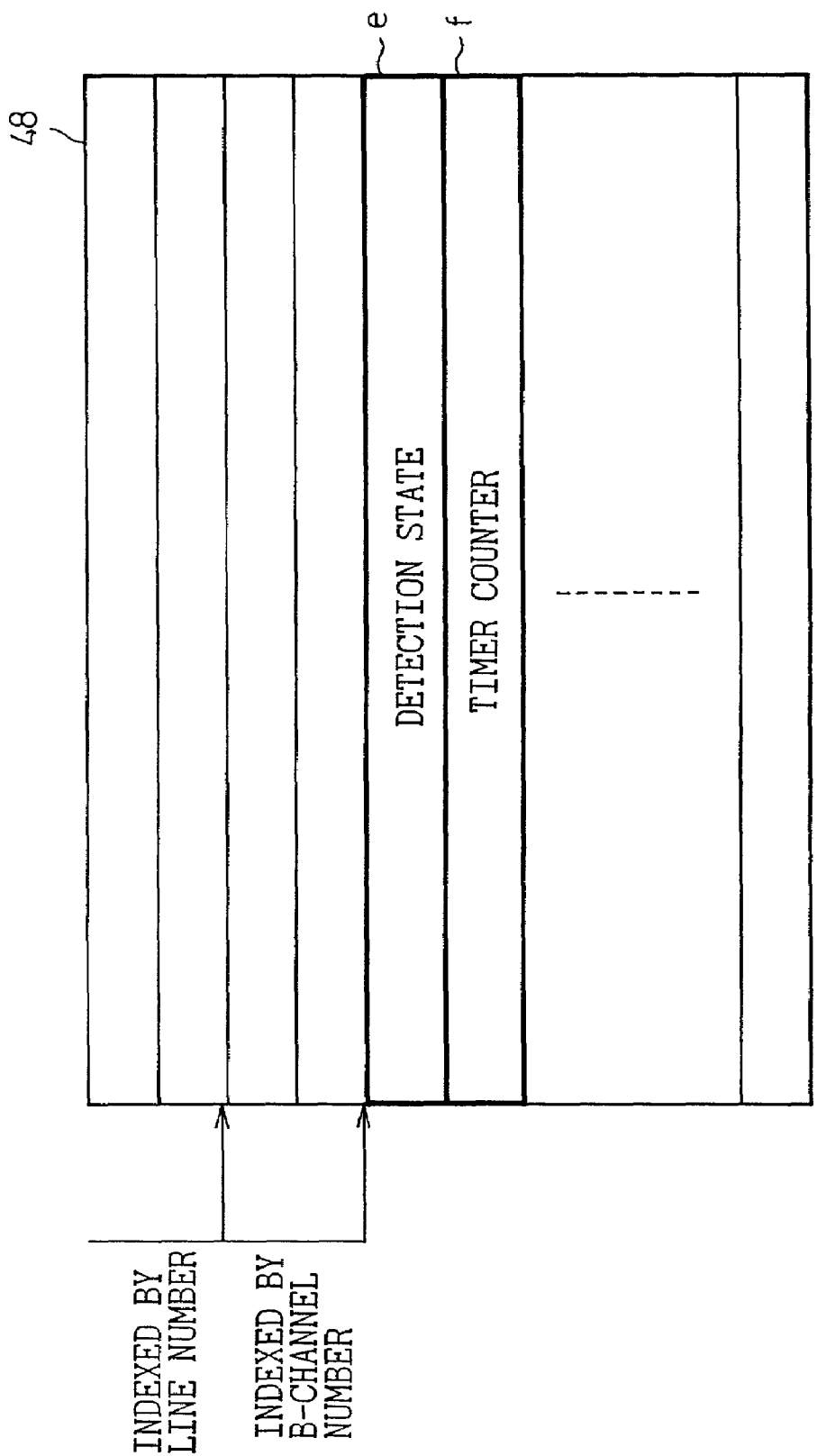
FIG. 9 is a view of a frame/cell status management table 48.

Step S25: The detection state of FIG. 9 is set for the initial state.

Figure 8:
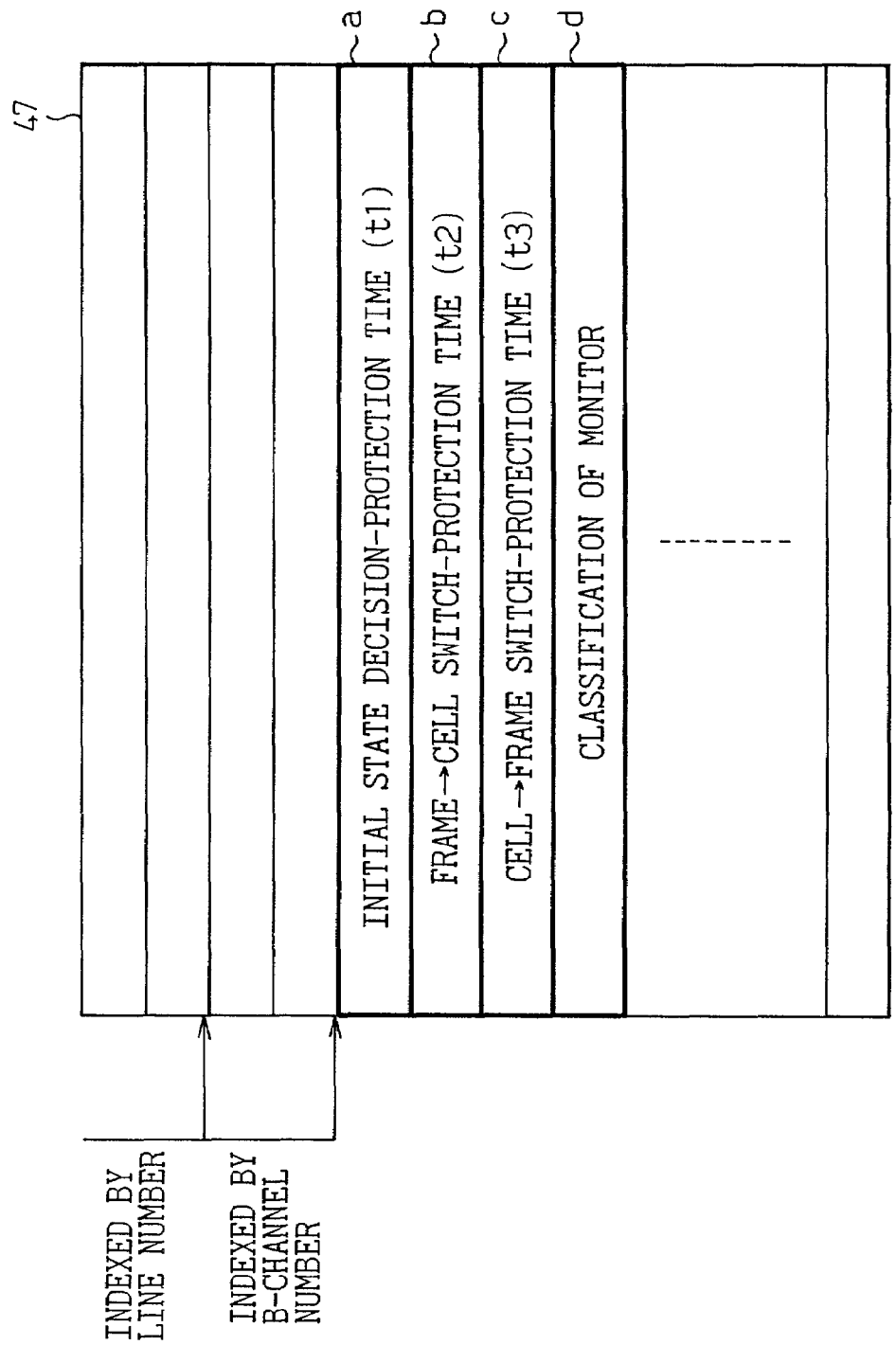
FIG. 8 is a view of a frame/cell switching information storing table 47.

Step S26: The t1 of FIG. 8 is set in the timer counter of FIG. 9.

In actuality, at the time of registration of the above t1, t2, and t3, they can be registered as follows.

t1 is registered by a command from the outside in units of B channels×N (N is 1, 2, 3, . . . ) or in units of channels.

t2 is registered by a command from the outside in units of B channels×N (N is 1, 2, 3, . . . ) or in units of channels.

t3 is registered by a command from the outside in units of B channels×N (N is 1, 2, 3, . . . ) or in units of channels.

Next, an explanation will be given of the above table by referring to FIG. 8, FIG. 9, and FIG. 10.

FIG. 8 is a view of the frame/cell switching information storing table 47,

FIG. 9 is a view of the frame/cell status management table 48, and

Figure 10:
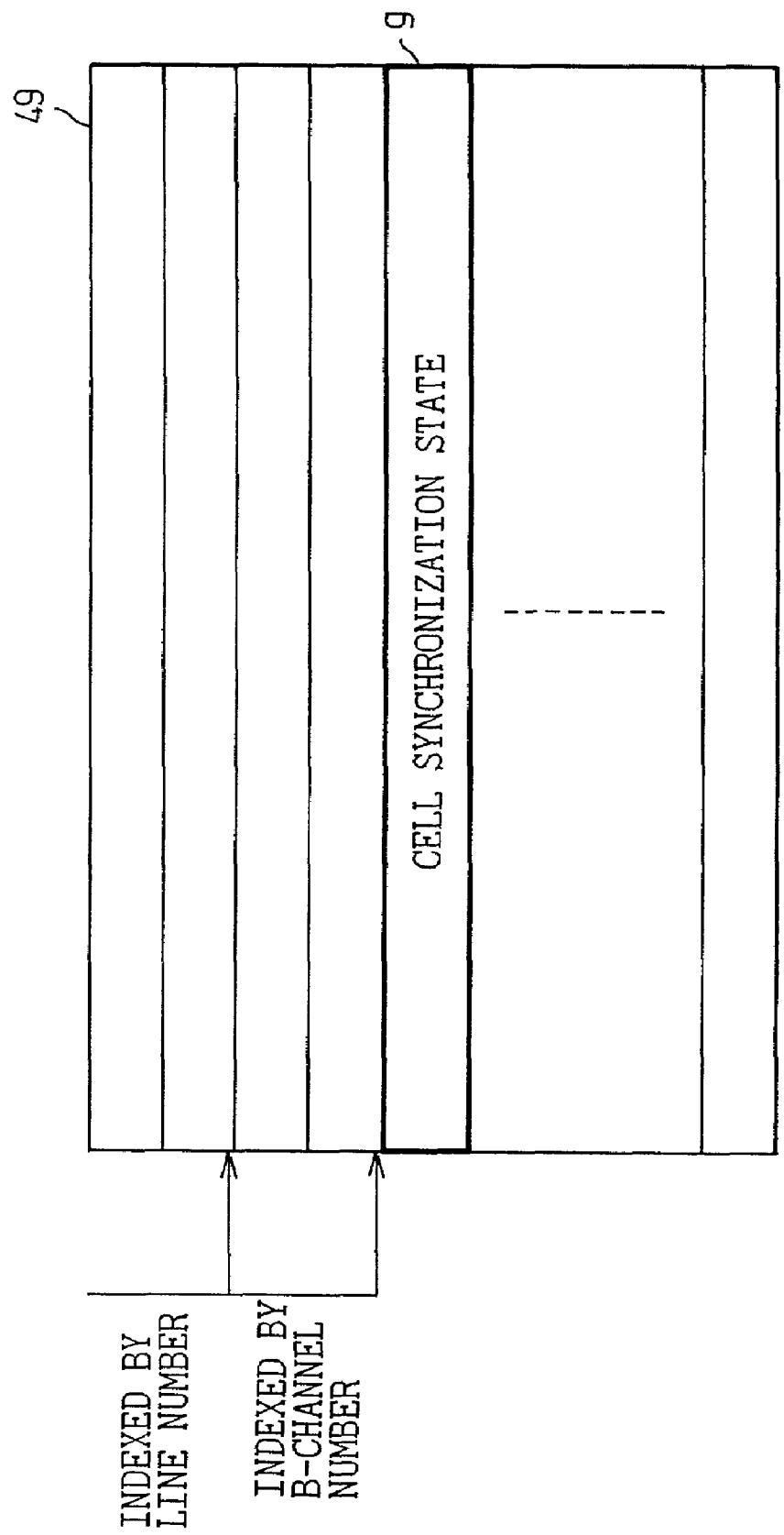
FIG. 10 is a view of a cell synchronization state indication table 49.

FIG. 10 is a view of the cell synchronization status indication table 49. The positions of these tables 47, 48, and 49 in the central processing unit 40 are as shown in FIG. 5.

Referring to FIG. 8 first, the frame/cell switching information storing table 47 is opened in the memory (MM) 35 and stores contents of the illustrated a, b, c, and d. This table 47 is first indexed by the line number indicating the path of the signal to be sent from the exchange 10. The indexed field is indexed by the B channel number (two-step index). Details of the contents of the a, b, c, and d to be indexed are as follows:

a. "Initial state decision-protection time" (t1): This indicates the protection time until it is deemed that cell synchronization has been achieved after the restart of the system. Note that the quotient obtained by dividing the parameter value designated by the operator with the frame/cell switching information storing command by 200 ms is stored.

b. "Frame→cell switch-protection time" (t2): This indicates the protection time until the opposing apparatus is regarded as an ATM communication apparatus rather than a frame communication apparatus. Note that, as this value, the quotient obtained by dividing the timer value by 200 ms is stored.

c. "Cell→frame switch-protection time" (t3): This indicates the protection time until the opposing apparatus is regarded as a frame communication apparatus rather than an ATM communication apparatus. Note that, as this value, the quotient obtained by dividing the timer value by 200 ms is stored.

d. "Classification of monitor": This indicates the classification of monitor (discrimination of frame/cell/auto).

Referring to FIG. 9 next, the frame/cell status management table 48 is opened in the memory 35 in the same way as the table 47 of FIG. 8, the contents of e and f are stored there, and two-step indexing is carried out. Details of the contents of e and f are as follows.

e. "Detection state": It indicates the detection state (either of initial state/frame/cell).

"Timer counter": This is information for deciding the detection state by the frame/cell switch function unit 43. This is set to t1 by the restart processing function unit 41 or the frame/cell switching information storing command processing function unit 45. Also, the related timer counter is decremented by 1 or is set to either of t2 or t3 according to the detection state or the cell synchronization state at the frame/cell detection function unit 42.

Referring to FIG. 10 next, the cell synchronization state indication table 49 is opened in the memory 35 in the same way as the table 47 (48) of FIG. 8 (9), a content of g is stored there, and two-step indexing is carried out. Details of the content of g are as follows.

g. "Cell synchronization state": This indicates the cell synchronization state (either in cell synchronization state/ not in cell synchronization state). Note that, the cell synchronization state of the related table is set by hardware using the cell synchronization circuit (32 of FIG. 4).

Here, referring to the above system configuration of FIG. 5, the table 47 of FIG. 8, and frame/cell detection unit 24 of FIG. 2, the frame/cell detection unit 24 includes an identifying means for monitoring for cell synchronization during the first certain time (above t1), automatically identifying that the opposing exchange or the opposing terminal of the other party of communication operates for frames when detecting that cell synchronization cannot be achieved during this certain time t1, and automatically identifying that the opposing exchange or the opposing terminal of the other party of communication operates for cells when detecting that cell synchronization could be continuously achieved during the certain time t1. This identifying means can be actually formed as part of the system configuration of FIG. 5.

Also, the frame/cell detection unit 24 includes an identifying means for subsequently monitoring for cell synchronization during the second certain time (above t2) while passing the frames through the frame side bus 12 while maintaining their signal format and automatically identifying that the opposing exchange or opposing terminal of the other party of communication has changed to one operating for cells when detecting that the cell synchronization could be achieved during this certain time t2. At this time, the frame/cell switch unit 14 switches to the ATM side bus 11, inputs the cells to the frame/cell compatibility function unit 13, processes the cells and converts them to the frame signal format, then passes them through the ATM side bus 11.

Further, the frame/cell detection unit 24 includes an identifying means for subsequently monitoring for cell synchronization during the third certain time (above t3) while passing cells through the ATM side bus 11 and automatically identifying that the opposing exchange or opposing terminal of the other party of communication has changed to one operating for frames when detecting that cell synchronization could not be established during this certain time t3. At this time, the frame/cell switch unit 14 switches to the frame side bus 12 and passes the frames through the frame side bus 12 while maintaining the signal format. This operation occurs in a case where a certain abnormality occurs in the exchange once switched to one operating for ATM and switched back to an exchange for a frame relay again.

Note that, generally, there are line faults other than that as the abnormalities. There is a case where communicating with an opposing exchange or an opposing terminal via an ISDN backup channel at the time of such a line fault, but at this time, the related communication can be monitored in units of B channels×N (N is 1, 2, 3, . . . ) during a period from completion of the connection to this ISDN backup channel to restoration of the channel due to the end of the line fault.

Also, when communicating with an opposing exchange or an opposing terminal via a high speed digital dedicated line, the communication can be monitored in units of B channels×N (N is 1, 2, 3, . . . )

The operation (2) will be explained continuing from the explanation of the operation (1).

Figure 11:
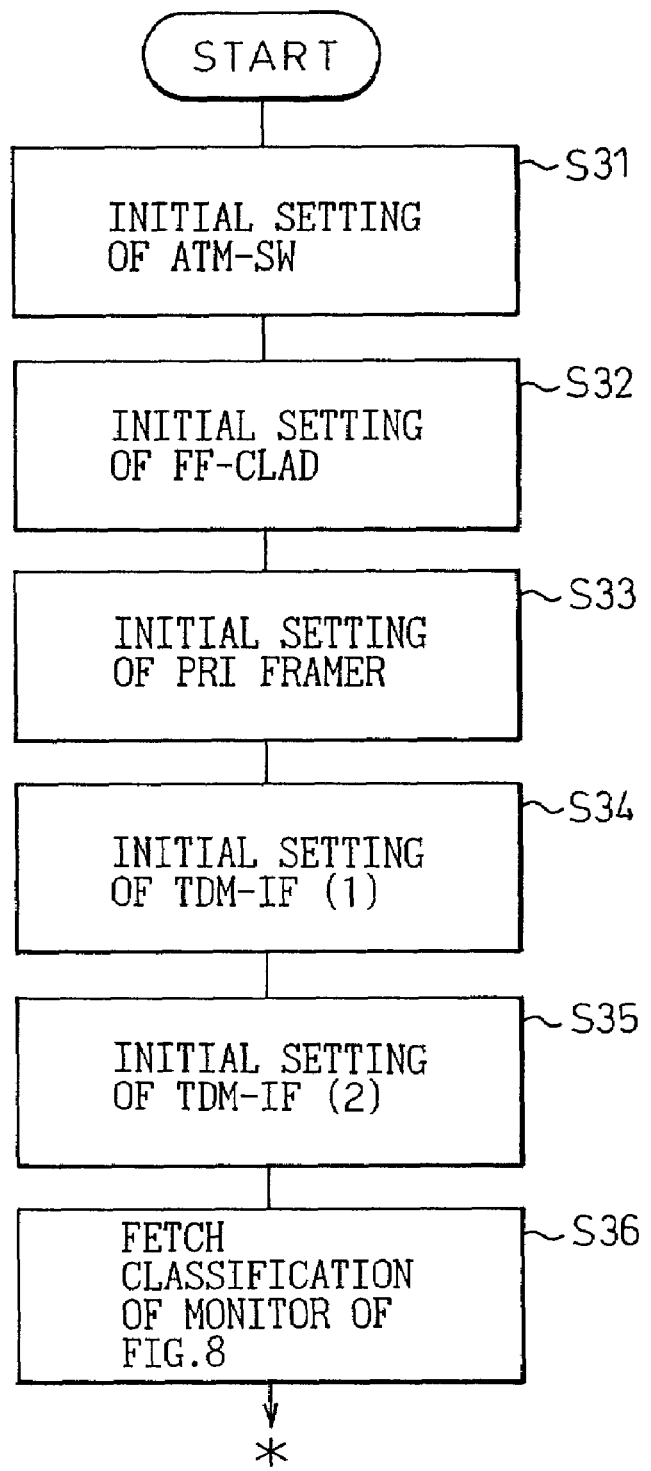
FIG. 11 is a first part of a view of the flow of processing of a restart processing function unit 41 shown in FIG. 5.
Figure 12:
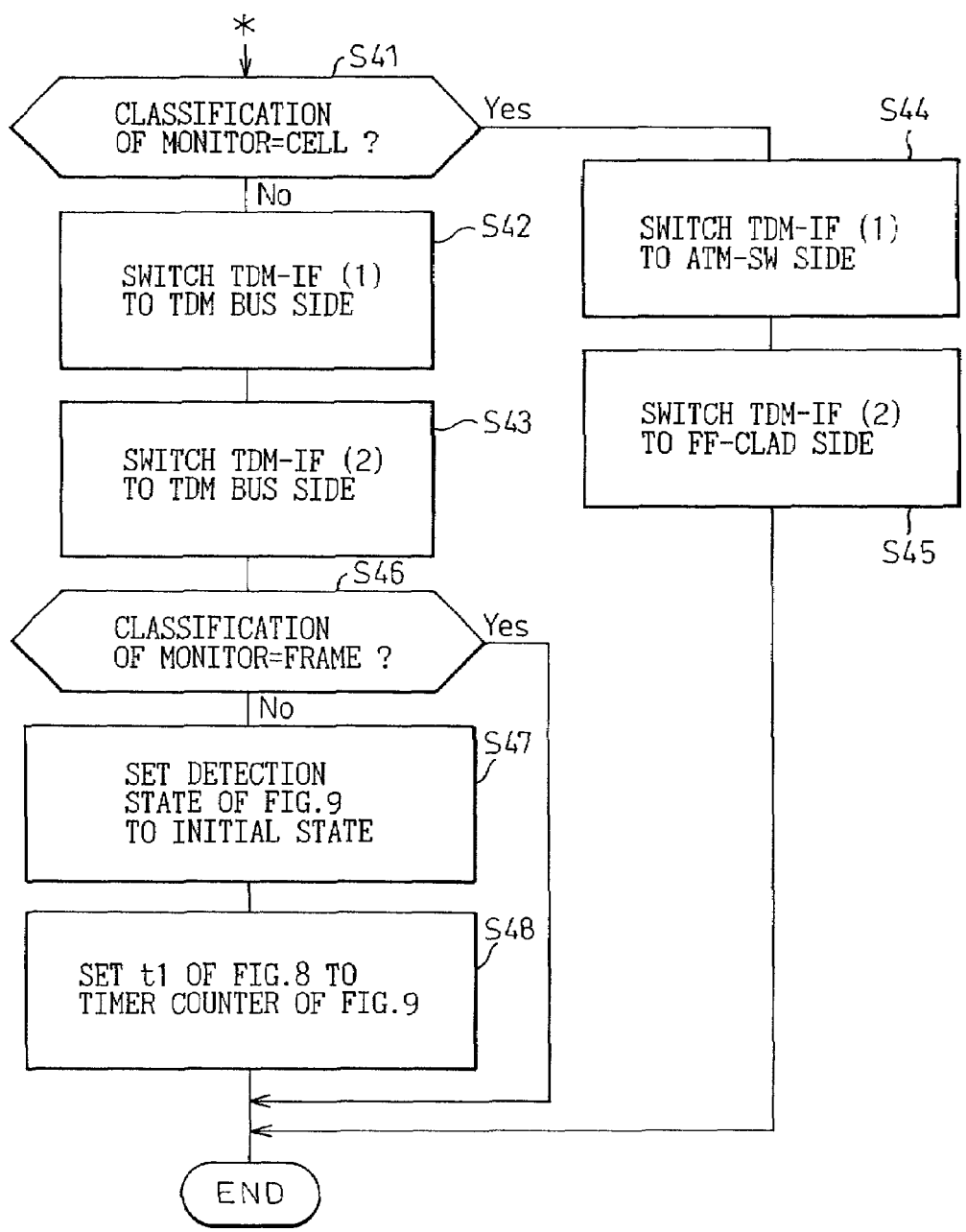
FIG. 12 is a second part of a view of the flow of processing of the restart processing function unit 41 shown in FIG. 5.
Figure 13:
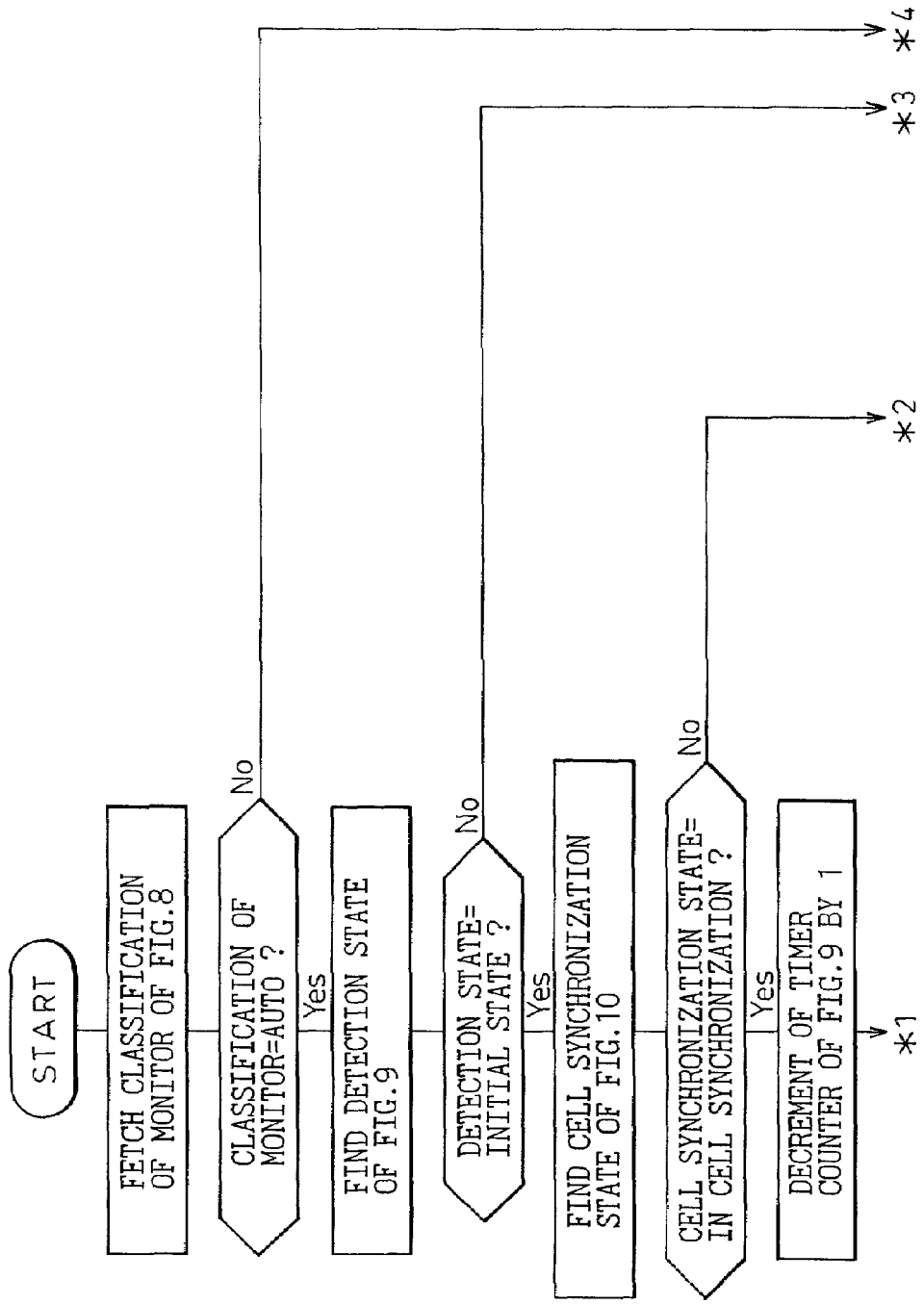
FIG. 13 is a first part of a view of the flow of processing of a frame/cell detection function unit 42 shown in FIG. 5.
Figure 14:
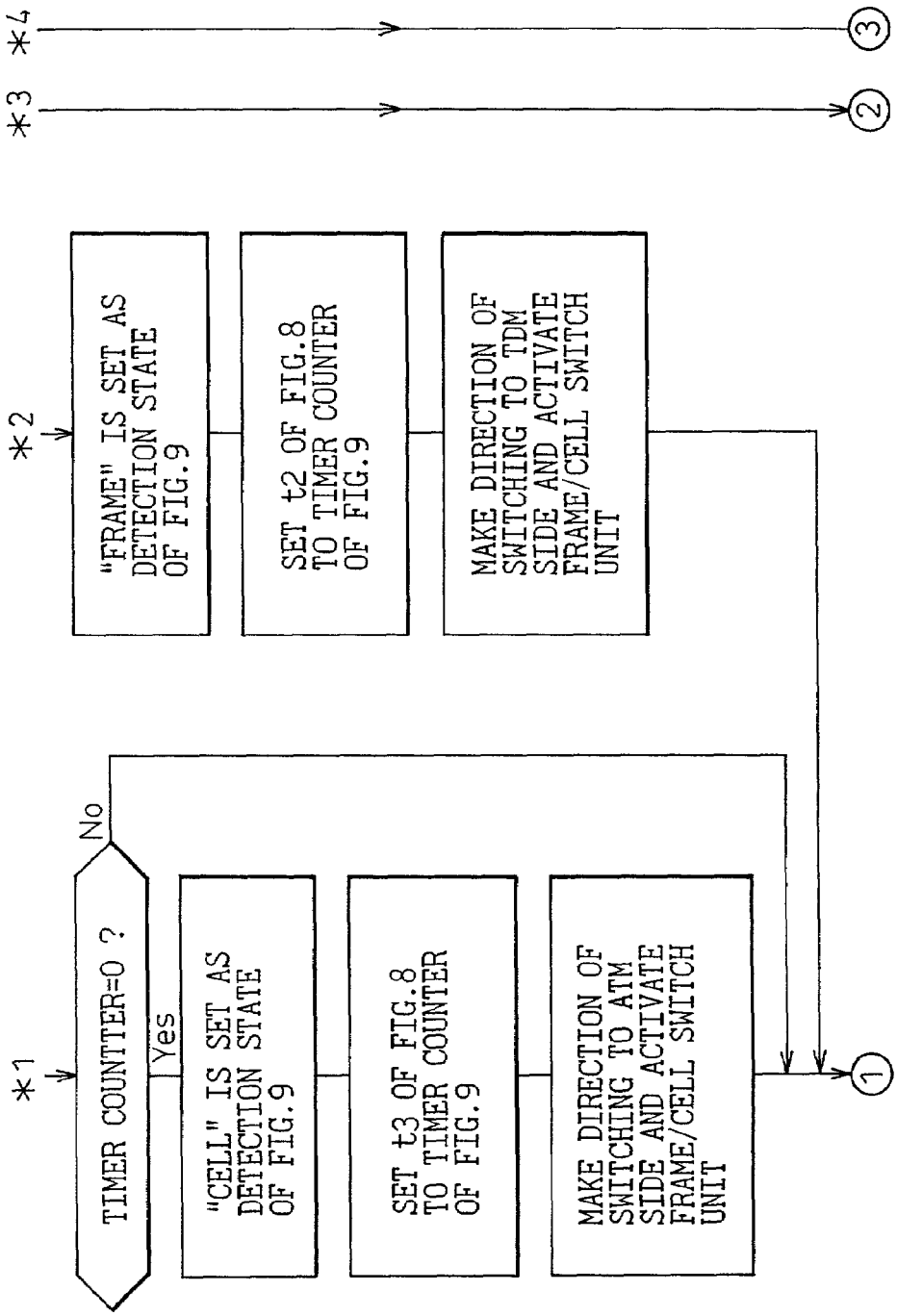
FIG. 14 is a second part of a view of the flow of processing of a frame/cell detection function unit 42 shown in FIG. 5.
Figure 15:
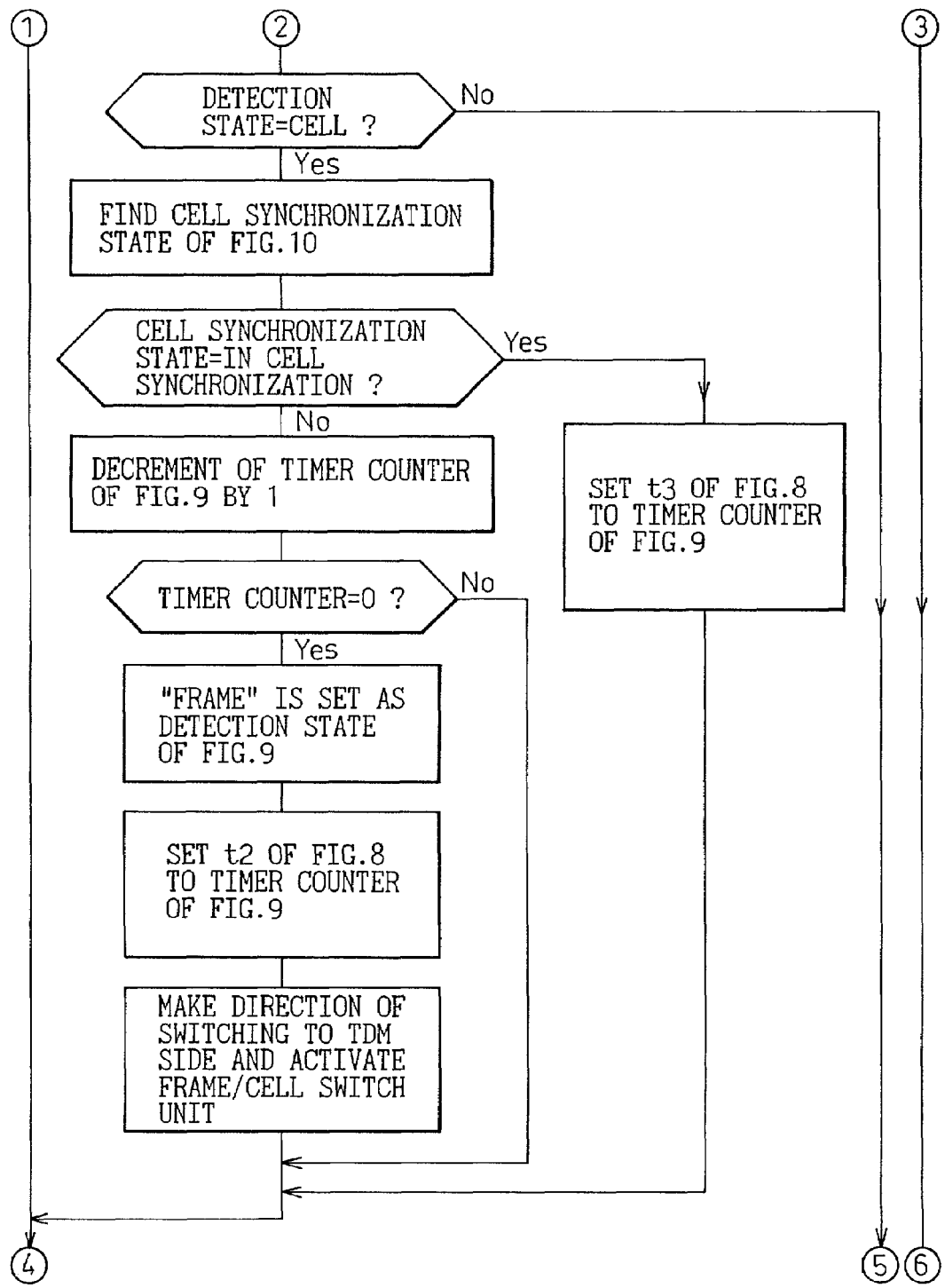
FIG. 15 is a third part of a view of the flow of processing of the frame/cell detection function unit 42 shown in FIG. 5.
Figure 16:
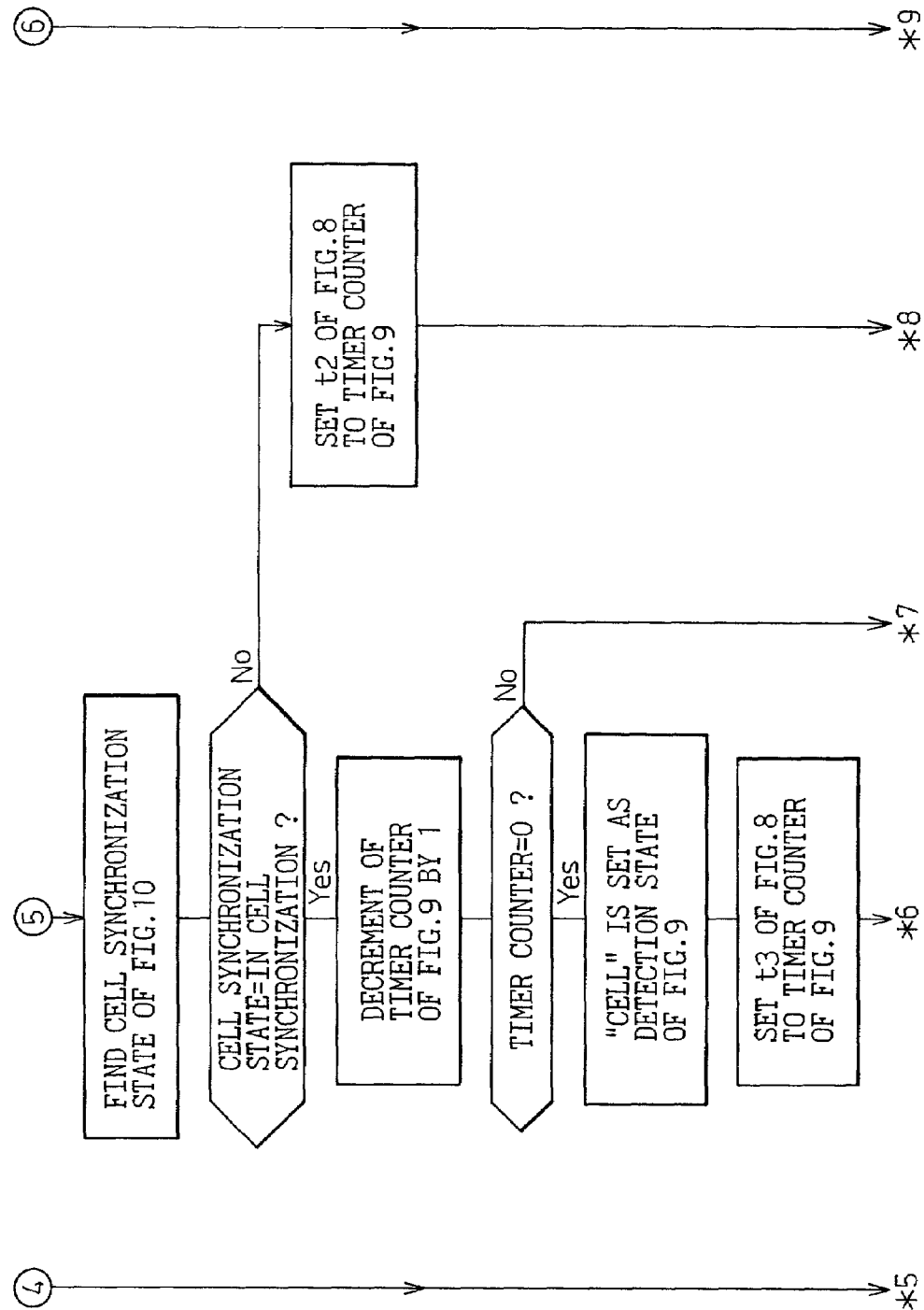
FIG. 16 is a fourth part of a view of the flow of processing of the frame/cell detection function unit 42 shown in FIG. 5.
Figure 17:
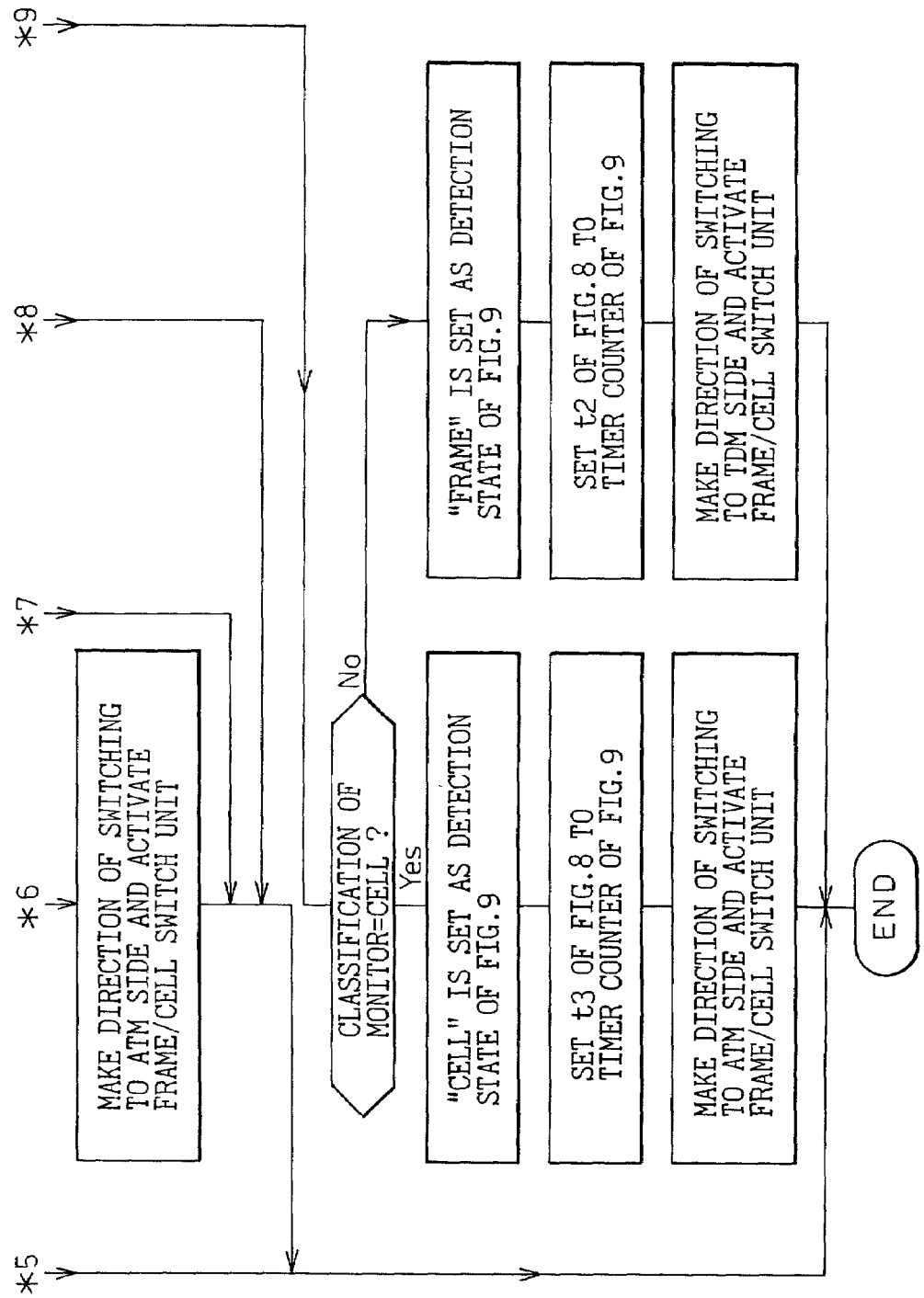
FIG. 17 is a fifth part of a view of the flow of processing of the frame/cell detection function unit 42 shown in FIG. 5.

(2) When the system restarts, the restart processing function unit 41 shown in FIG. 5 is activated and initializes various devices according to the predetermined flow III (FIGS. 11, 12). Thereafter, the "classification of monitor" of FIG. 8 is decided. In the case of "CELL", in FIG. 3 and FIG. 4, the TDM-IF unit (1) 33 is switched to the ATM-SW 21 side, and the TDM-IF unit (2) 37 is switched to the FF-CLAD circuit 23 side. In the case where the "classification of monitor" is other than "CELL", the TDM-IF unit (1) 33 and the TDM-IF unit (2) 37 are switched to the TDM bus 12 side. In the case where the "classification of monitor" is other than "FRAME" (that is "AUTO"), the "detection state" of FIG. 9 is brought to the initial state, and t1 of FIG. 8 is set in the "timer counter". Note that, an explanation will be given of the predetermined flow III by using the figures.

FIG. 11 and FIG. 12 are first and second parts of a view of the flow of processing of the restart processing function unit 41 shown in FIG. 5.

Step S31: The ATM-SW 21 is initialized.
Step S32: The FF-CLAD circuit 23 is initialized.
Step S33: The PRI framers 31 and 38 are initialized.
Step S34: The TDM-IF unit (1) 33 is initialized.
Step S35: the TDM-IF unit (2) 37 is initialized.
Step S36: The "classification of monitor" of FIG. 8 is fetched from the table 47.

The above steps S31 to S35 are for initializing the system LSI device and for initialization based on the office data. Note that the office data is registered in advance in the related exchange from the system console 36. The information related to FIG. 12 explained later of whether the opposing exchange or opposing terminal of the other party of communication operates for frames or for cells can be registered as the office data in units of B channels×N (N is 1, 2, 3, . . . ) or in units of channels.

Alternatively, it can be registered as the office data in units of B channels×N (N is 1, 2, 3, . . . ) or in units of channels that whether the opposing exchange or opposing terminal of the other party of communication operates for frames or for cells should be automatically identified by the frame/cell detection unit 24.

Referring to FIG. 12,
Step S41: It is decided if the "classification of monitor" is "CELL".
Step S42: When the result is No, the TDM-IF unit (1) 33 is switched to the TDM bus 12 side.
Step S43: Further, the TDM-IF unit (2) 37 is switched to the TDM bus 12 side.

Step S44: When the result of decision of step 41 is Yes, the TDM-IF unit (1) 33 is switched to the ATM-SW 21 side.
Step S45: Further, the TDM-IF unit (2) 37 is switched to the FF-CLAD circuit 23 side.
Step S46: When passing through step S43, it is decided if the "classification of monitor" is "FRAME".
Step S47: When the result is No, the "detection state" of FIG. 9 is set to the initial state.
Step S48: Further, t1 of FIG. 8 is set in the "timer counter" of FIG. 9.

(3) After the restart of the system, the frame/cell detection function unit 42 is periodically activated (activated at every 200 ms) by the operating system. When the frame/cell detection function unit 42 is periodically activated, according to a predetermined flow IV (FIGS. 13 to 17), the "classification of monitor" of FIG. 8 is decided. When the "classification of monitor" is "CELL", the "detection state" of FIG. 9 is set to "CELL", t3 of FIG. 8 is set in the "timer counter", and the frame/cell switch function unit 43 is activated by setting the direction of switching the bus to the ATM side bus 11. Where the "classification of monitor" is "FRAME", the "detection state" of FIG. 9 is set to "FRAME", t2 of FIG. 8 is set in the "timer counter", then the frame/cell switch function unit 43 is activated by setting the direction of switching the bus to the TDM bus 12 side. When the "classification of monitor" is "AUTO", the "detection state" of FIG. 9 is fetched from the table 48. The processing is branched by this detection state.

When the "detection state" is the initial state, the "cell synchronization state" of FIG. 10 is found. When it is not "cell synchronization", the "detection state" of FIG. 9 is set to "FRAME", t2 of FIG. 8 is set in the "timer counter", and the frame/cell switch function unit 43 is activated by setting the direction of switching the bus to the TDM bus 11 side. When the "cell synchronization state" of FIG. 10 is "cell synchronization", the value of the "timer counter" of FIG. 9 is decremented by 1. When the timer counter is other than 0, the periodical activation is continued as it is. Where the timer counter is 0, the "detection state" of FIG. 9 is set to "CELL", t3 of FIG. 8 is set in the "timer counter", and the frame/cell switch function unit 43 is activated by setting direction of switching the bus to the ATM side bus 11.

When the "detection state" is "CELL", the "cell synchronization state" of FIG. 10 is found. When it is "synchronization", t3 of FIG. 8 is set in the "timer counter" of FIG. 9. When the "cell synchronization state" of FIG. 10 is not "cell synchronization", the value of the "timer counter" of FIG. 9 is decremented by 1. When the timer counter is other than 0, the periodical activation is continued as it is. When the value of the "timer counter" is 0, the "detection state" of FIG. 9 is set to "FRAME", t2 of FIG. 8 is set in the "timer counter" to set the direction of switching the bus to the TDM bus 11 side, and the frame/cell switch function unit 43 is activated.

When the "detection state" is "FRAME", the "cell synchronization state" of FIG. 10 is found. When it is not "cell synchronization", t2 of FIG. 8 is set in the "timer counter" of FIG. 9. When the "cell synchronization state" of FIG. 10 is "cell synchronization", the "timer counter" of FIG. 9 is decremented by 1. When the "timer counter" is other than 0, the periodical activation is continued as it is. When the timer counter is 0, the "detection state" of FIG. 9 is set to "CELL", t3 of FIG. 8 is set in the "timer counter" to set the direction of switching the bus to the ATM side bus 11, and the frame/cell switch function unit 43 is activated.

Note that the predetermined flow IV is also indicated by the figure.

FIG. 13 to FIG. 17 are first to fifth parts of a view of the flow of processing of the frame/cell detection function unit 42 shown in FIG. 5.

(4) When the frame/cell switch function unit 43 is activated by the frame/cell detection function unit 42, if the direction of switching the bus is requested to be made the TDM bus 12 side by a predetermined flow V (FIGS. 18, 19), the current setting conditions of the TDM-IF unit (1) 33 are found by the hard register. When the current setting conditions are the ATM-SW 21 side, the TDM-IF unit (1) 33 is switched to the TDM bus 12 side.

Similarly, the current setting conditions of the TDM-IF unit (2) 37 are found by the hard register. When the current setting conditions are the FF-CLAD circuit 23, the TDM-IF unit (2) 37 is switched to the TDM bus 12 side.

On the other hand, when the direction of switching the bus is requested to be the ATM bus 11 side, the current setting conditions of the TDM-IF unit (1) 33 are found by the hard register. When the current setting conditions are not the ATM-SW 21 side, the TDM-IF unit (1) 33 is switched to the ATM-SW 21 side.

Similarly, the current setting conditions of the TDM-IF unit (2) 37 are found by the hard register. When the current setting conditions are not the FF-CLAD circuit 23, the TDM-IF unit (2) 37 is switched to the FF-CLAD circuit 23 side.

Note that the predetermined flow V is indicated also by the figures.

Figure 18:
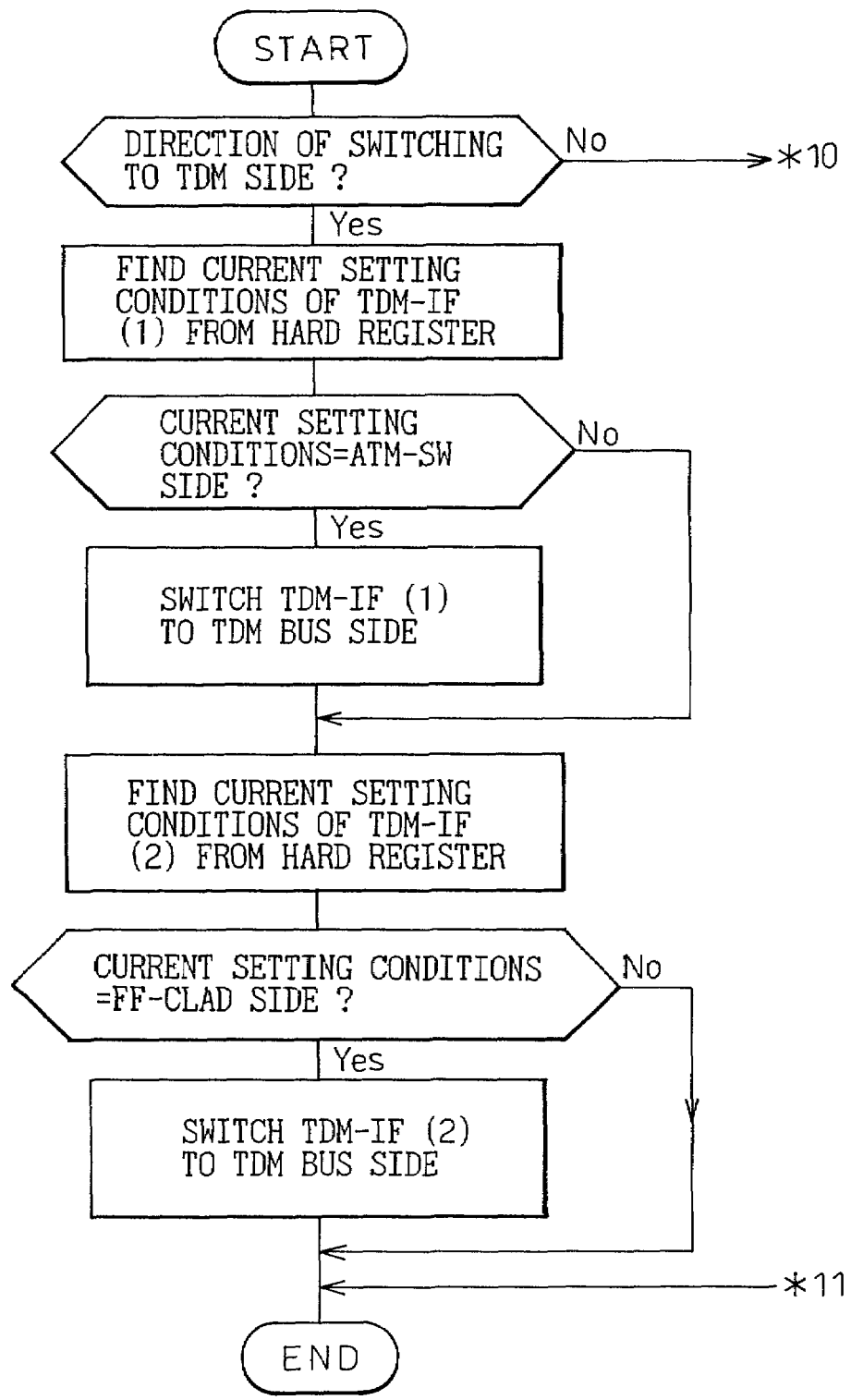
FIG. 18 is first part of a view of the flow of processing of a frame/cell switch function unit 43 shown in FIG. 5.
Figure 19:
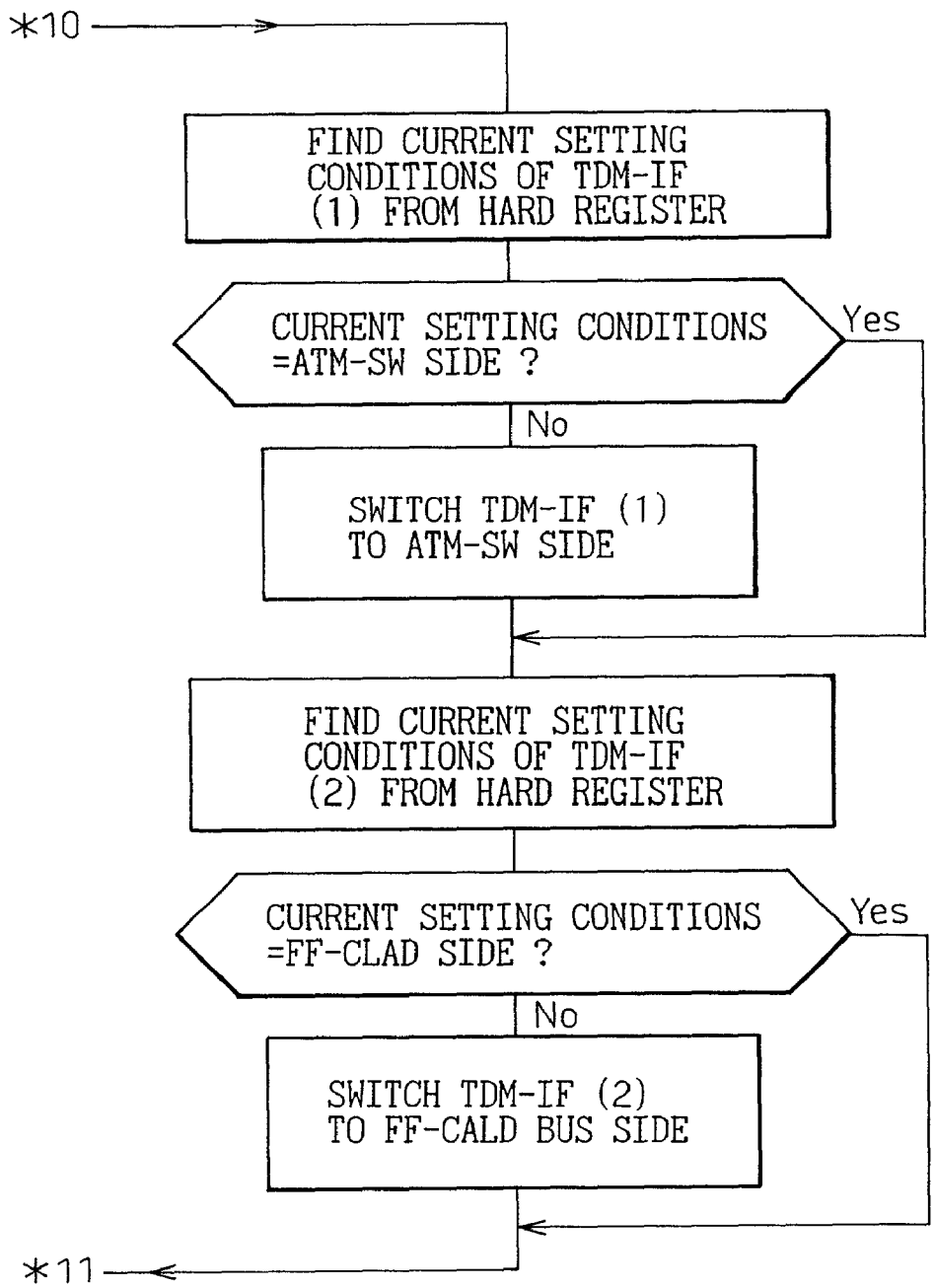
FIG. 19 is a second part of a view of the flow of processing of the frame/cell switch function unit 43 shown in FIG. 5.

FIG. 18 and FIG. 19 are first and second parts of a view of the flow of processing of the frame/cell switch function unit 43 shown in FIG. 5.

(5) When the operator enters the frame/cell status indication command from the system console 36 in order to obtain a grasp of the detection state of the frame/cell, the command reception processing function unit 44 is activated, and the frame/cell status indication command processing function unit 46 is activated by the predetermined flow III (FIGS. 11, 12 explained above).

In the frame/cell status indication command processing function unit 46, by referring to the tables 47 and 48 of FIG. 8 and FIG. 9 by a predetermined flow VI (FIGS. 20, 21), the "classification of monitor" and the "detection state" when this "classification of monitor" is "AUTO" are displayed on the system console 36.

An explanation will be given next of the predetermined flow VI by referring to the drawings.

Figure 20:
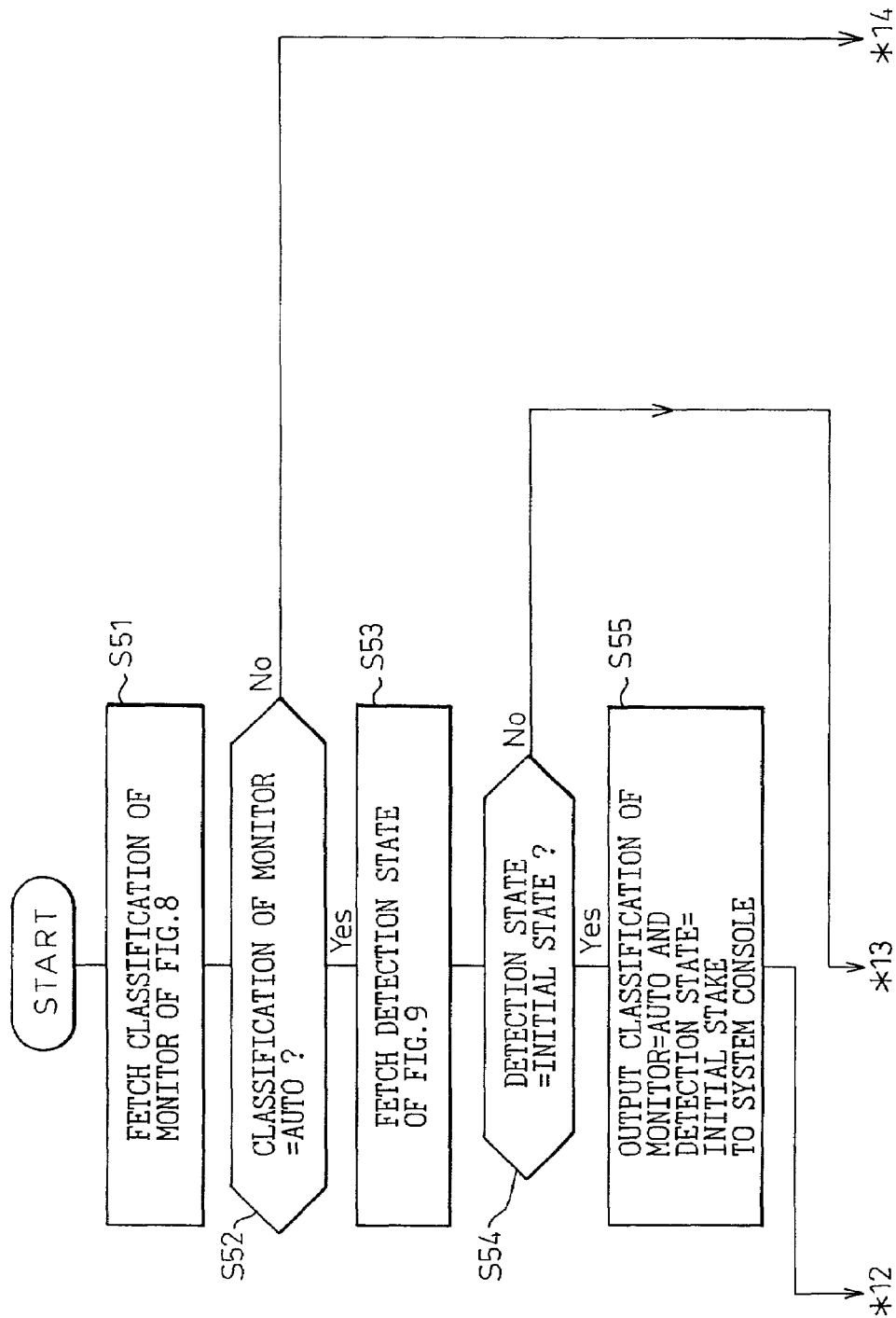
FIG. 20 is first part of a view of the flow of processing of a frame/cell status indication command processing function unit 46 shown in FIG. 5.
Figure 21:
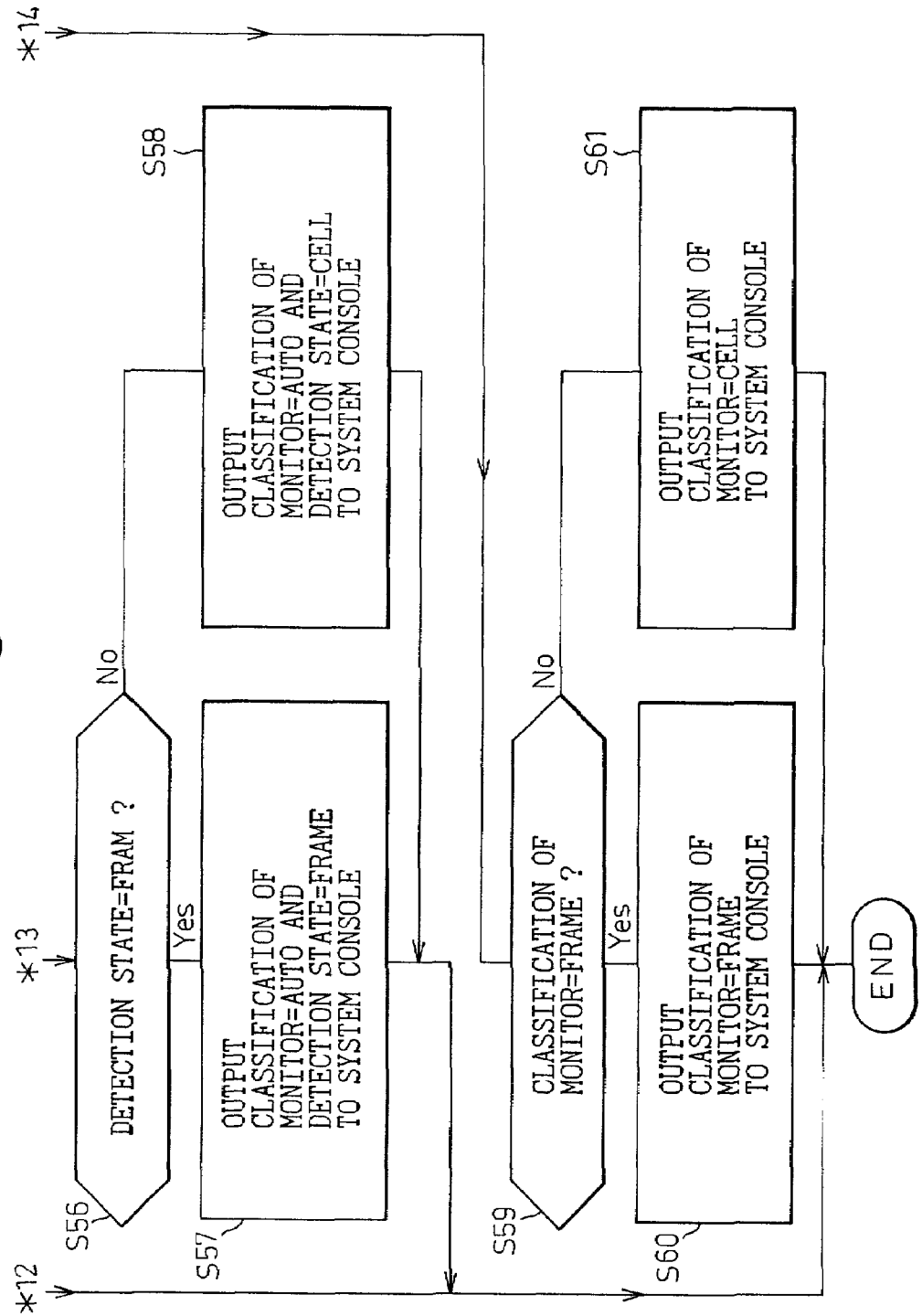
FIG. 21 is a second part of a view of the flow of processing of the frame/cell status indication command processing function unit 46 shown in FIG. 5.

FIG. 20 and FIG. 21 are first and second parts of a view of the flow of processing of the frame/cell status indication command processing function unit 46 shown in FIG. 5.

Step S51: The "classification of monitor" of FIG. 8 is fetched from the table 47.

Step S52: It is decided if the "classification of monitor" is "AUTO".

Step S53: When the result is Yes, the "detection state" of FIG. 9 is fetched from the table 48.

Step S54: It is decided if the "detection state" is the initial state.

Step S55: When the result is Yes, "AUTO" is output as the "classification of monitor", and "initial state" is output as the "detection state" to the system console 36.

Step S56: When the result of step S54 is No, it is decided if the "detection state" is "FRAME".

Step S57: When the result is Yes, "AUTO" is output as the "classification of monitor", and "FRAME" is output as the "detection state" to the system console 36.

Step S58: When the result is No, "AUTO" is output as the "classification of monitor", and "CELL" is output as the "detection state" to the system console 36.

Step S59: When the result of step S52 is No, it is decided if the "classification of monitor" is "FRAME".

Step S60: If the result is Yes, "FRAME" is output as the "classification of monitor" to the system console 36.

Step S61: When the result is No, "CELL" is output as the "classification of monitor" to the system console 36.

As explained in detail, according to the present invention, when shifting from an already existing packet network or frame relay network to an ATM network, it is not necessary to synchronize with the remote office in order to change the connections of the relay lines. Therefore, it is possible to shift in a short period in comparison with the conventional case.

For example, as in FIG. 22, when a frame relay network comprised in the form of a tree from the office A to the offices B1 to Bm is shifted to an ATM network, as shown in FIG. 24, when replacing the office A cooperating the offices B1 to Bm by the office X to which the present invention is applied, the frame/cell detection unit 24 of the office X identifies that the channels connected with the offices B1 to Bm are "FRAME". By switching the TDM-IF unit (1) 33 and TDM-IF unit (2) 37 to the TDM side bus 12 by the frame/cell switch unit 14, frame communication becomes possible between the offices B1 to Bm and the office X.

Thereafter, even if there is no worker at the office X, if the office B1 is replaced by the office Y1, at the office X, the frame/cell detection unit 24 regards that the ATM communication apparatus was connected after an elapse of the protection time t2 for the channel with the office Y1 and switches the TDM-IF unit (1) 33 and the TDM-IF unit (2) 37 to the sides of the ATM-SW 21 and the FF-CLAD circuit 23 by the frame/cell switch unit 14.

Here, cell-based communication becomes possible between the office Y1 and the office X.

Similarly, also the shift from the offices B2 to Bm to the offices Y2 to Ym is possible without intervention of a worker at the office X. In this way, a simultaneous shift from the offices B1 to Bm to the offices Y1 to Ym becomes easy, so it becomes possible to complete the shift from FIG. 22 to FIG. 23 in a short period. Further, human error such as connection error of the cables is almost completely eliminated, so highly reliable switching of the communication modes becomes possible.

While the invention has been described by reference to specific embodiments chosen for purposes of illustration, it should be apparent that numerous modifications could be made thereto by those skilled in the art without departing from the basic concept and scope of the invention.

What is claimed is:

1. A method for switching communication modes for shifting an exchange from a frame relay exchange having a packet exchange processing unit to an ATM exchange in a communication system having a plurality of exchanges each accommodating a plurality of terminals and including a frame relay exchange having a packet exchange processing unit and having a network for connecting the plurality of exchanges to each other in order to transfer data among said plurality of terminals, comprising
a first step of selecting any one exchange among said plurality of exchanges,
a second step of operating said selected exchange as a frame/cell compatible type exchange capable of operating for both outputting input frame relay signals for said frame relay exchange as ATM cell signals and outputting input ATM cell signals as frame relay signals for said frame relay exchange, reversibly, and a third step of executing said first step and second step for an exchange which has not yet been selected and repeating said third step to autonomously shift all said exchanges to said ATM exchanges, wherein, in said second step, whether an opposing exchange or an opposing terminal of an other party of communication operates for frames or operates for cells is registered on said selected exchange side in advance as office data, and the selected exchange is operated as an exchange operating for frames or an exchange operating for cells according to the office data.

2. A method for switching communication modes for shifting an exchange from a frame relay exchange having a packet exchange processing unit to an ATM exchange in a communication system having a plurality of exchanges each accommodating a plurality of terminals and including a frame relay exchange having a packet exchange processing unit and having a network for connecting the plurality of exchanges to each other in order to transfer data among said plurality of terminals, comprising a first step of selecting any one exchange among said plurality of exchanges, a second step of operating said selected exchange as a frame/cell compatible type exchange capable of operating for both outputting input frame relay signals for said frame relay exchange as ATM cell signals and outputting input ATM cell signals as frame relay signals for said frame relay exchange, reversibly, and a third step of executing said first step and second step for an exchange which has not yet been selected and repeating said third step to autonomously shift all said exchanges to said ATM exchanges, wherein, in said second step, whether an opposing exchange or an opposing terminal of another party of communication operates for frames or operates for cells is automatically identified in said selected exchange, and the selected exchange is operated as an exchange operating for frames or an exchange operating for cells according to the result of the identification.

3. An exchange used in a communication system having a plurality of exchanges each accommodating a plurality of terminals and including a frame relay exchange having a packet exchange processing unit, and having a network for connecting the plurality of the exchanges to each other in order to transfer data among said plurality of terminals, said exchange comprising:

an ATM side bus and a frame relay side bus provided in parallel, a frame/cell compatibility function unit inserted in said ATM side bus, said frame/cell compatibility function unit being capable of both outputting input frame relay signals for said frame relay exchange as ATM cell signals and outputting input ATM cell signals as frame relay signals for said frame relay exchange, reversibly, and a frame/cell switch unit for alternatively switching between said ATM side bus and frame relay side bus, wherein said frame/cell switch unit switches alternatively between said ATM side bus and frame side bus in accordance with an instruction from the outside, and said instruction is given according to office data registered in advance.

4. An exchange as set forth in claim 3, wherein said frame/cell compatibility function unit is comprised of an ATM switch and a frame/cell format converting unit connected to the ATM switch.

5. An exchange as set forth in claim 4, wherein said frame/cell format converting unit is a frame forwarding CLAD circuit.

6. An exchange as set forth in claim 3, further provided with a system console, the switch state to said ATM side bus or to frame side bus by said frame/cell switch unit being displayed on the system console.

7. An exchange as set forth in claim 3, wherein whether an opposing exchange or an opposing terminal of another party of communication operates for frames or operates for cells as office data is registered in units of B channels N (N is 1, 2, 3 . . . ) or in units of channels.

8. An exchange used in a communication system having a plurality of exchanges each accommodating a plurality of terminals and including a frame relay exchange having a packet exchange processing unit and having a network for connecting the plurality of the exchanges to each other in order to transfer data among said plurality of terminals, said exchange comprising:

an ATM side bus and a frame relay side bus provided in parallel, a frame/cell compatibility function unit inserted in said ATM side bus, said frame/cell compatibility function unit being capable of both outputting input frame relay signals for said frame relay exchange as ATM cell signals and outputting input ATM cell signals as frame relay signals for said frame relay exchange, reversibly, and a frame/cell switch unit for alternatively switching between said ATM side bus and frame relay side bus, wherein said frame/cell switch unit switches alternatively between said ATM side bus and frame side bus in accordance with an instruction from the outside, said exchange further provided with:

a frame/cell detection unit for detecting whether a signal input from the outside is comprised of frames or cells, said instruction being created in accordance with the result of detection by this frame/cell detection unit, a pair of said frame/cell switch units formed at the two end portions of said ATM side bus and frame side bus provided in parallel and a switch control unit for receiving as input the result of detection by said frame/cell detection unit and controlling said pair of interlocked frame/cell switch units.

9. An exchange as set forth in claim 8, wherein said frame/cell detection unit is comprised of a cell synchronization circuit.

10. An exchange as set forth in claim 8, wherein said frame/cell detection unit has an identifying means for monitoring for cell synchronization during a first time t1 and automatically identifying that an opposing exchange or an opposing terminal of another party of communication operates for frames when detecting that cell synchronization cannot be established during the time t1.

11. An exchange as set forth in claim 8, wherein said frame/cell detection unit has an identifying means for monitoring for cell synchronization during a first certain time t1 and automatically identifying that an opposing exchange or an opposing terminal of another party of communication operates for cells when detecting that cell synchronization can be continuously established during the time t1.

12. An exchange as set forth in claim 10 or 11, wherein when communicating with said opposing exchange or opposing terminal via high speed digital dedicated lines, said monitoring is carried out in units of B channels N (N is 1, 2, 3, . . . ).

13. An exchange as set forth in claim 10 or 11, wherein when communicating with said opposing exchange or opposing terminal via an ISDN backup channel at the time of a line fault, said monitoring is carried out with respect to the related communication in units of B channels N (N is 1, 2, 3, . . . ) during the period from completion of the connection to the ISDN backup channel to restoration of the channel due to the end of the line fault.

14. An exchange as set forth in claim 10 or 11, wherein said first certain time t1 is registered in units of B channels N (N is 1, 2, 3, . . . ) or in units of channels by a command from the outside.

15. An exchange as set forth in claim 8, wherein, when said frame/cell detection unit detects that a signal input from the outside is comprised of frames, said frame/cell switch unit switches to said frame side bus and passes the frames through the frame side bus while maintaining the signal format.

16. An exchange as set forth in claim 15, wherein said frame/cell detection unit has
- an identifying means for subsequently monitoring for cell synchronization during a second certain time t2 while passing said frames through said frame side bus while maintaining the signal format and automatically identifying that an opposing exchange or opposing terminal of another party of communication has changed to one operating for cells when detecting that cell synchronization could be established during the time t2, and
- said frame/cell switch unit switches the bus to said ATM side bus, inputs the cells to said frame/cell compatibility function unit, processes the cells and converts them to the frame signal format, and then passes the same through the ATM side bus.

17. An exchange as set forth in claim 16, wherein said second certain time t2 is registered in units of B channels N (N is 1, 2, 3, . . . ) or in units of channels by a command from the outside.

18. An exchange as set forth in claim 8, wherein, when said frame/cell detection unit detects that a signal input from the outside is comprised of cells, said frame/cell switch unit switches to said ATM side bus, inputs the cells to said frame/cell compatibility function unit, processes the cells and converts them to the frame signal format, then passes the same through the ATM side bus.

19. An exchange as set forth in claim 18, wherein said frame/cell detection unit has
- an identifying means for subsequently monitoring for cell synchronization during a third certain time t3 while passing said cells through said ATM side bus and automatically identifying that an opposing exchange or opposing terminal of another party of communication has changed to one operating for frames when detecting that cell synchronization cannot be established during the time t3, and
- said frame/cell switch unit switches the bus to said frame side bus and passes the frames through the frame side bus while maintaining the signal format.

20. An exchange as set forth in claim 19, wherein said third certain time t3 is registered in units of B channels N (N is 1, 2, 3, . . . ) or in units of channels by a command from the outside.

21. An exchange as set forth in claim 8, wherein the fact that the identification of whether the opposing exchange or opposing terminal of the other party of communication operates for frames or operates for cells should be automatically identified by said frame/cell detection unit is registered as the office data in units of B channels N (N is 1, 2, 3, . . . ) or in units of channels.

22. An exchange as set forth in claim 8, wherein said frame/cell compatibility function unit is comprised of an ATM switch and a frame/cell format converting unit connected to the ATM switch.

23. An exchange as set forth in claim 22, wherein said frame/cell format converting unit is a frame forwarding CLAD circuit.

* * * * *